US012594655B2

(12) United States Patent
Ueda et al.

(10) Patent No.: US 12,594,655 B2
(45) Date of Patent: Apr. 7, 2026

(54) DRIVING TOOL WITH ROTATING MEMBER TO MOVE STRIKING UNIT

(71) Applicant: KOKI HOLDINGS CO., LTD., Tokyo (JP)

(72) Inventors: Takashi Ueda, Ibaraki (JP); Koji Shioya, Ibaraki (JP); Sotaro Aizawa, Ibaraki (JP); Toshinori Yasutomi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 18/599,352

(22) Filed: Mar. 8, 2024

(65) Prior Publication Data

US 2024/0208021 A1 Jun. 27, 2024

Related U.S. Application Data

(63) Continuation of application No. 17/270,183, filed as application No. PCT/JP2019/036146 on Sep. 13, 2019, now Pat. No. 11,926,027.

(30) Foreign Application Priority Data

Sep. 21, 2018 (JP) ................................ 2018-176893

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .................................. B25C 1/047; B25C 1/06
See application file for complete search history.

(56) References Cited

U.S. PATENT DOCUMENTS 10,173,310 B2 1/2019 Wyler et al.
10,702,932 B2 * 7/2020 Kumakura ............ B23D 45/16
(Continued)

FOREIGN PATENT DOCUMENTS

EP 3308907 A1 4/2018
WO 2015/182508 A1 12/2015
WO 2016/199670 A1 12/2016

OTHER PUBLICATIONS

International Search Report issued in corresponding International Patent Application No. PCT/JP2019/036146, Nov. 12, 2019, with English translation.

(Continued)

*Primary Examiner* — Joshua G Kotis
(74) *Attorney, Agent, or Firm* — Rimon P.C.

(57) ABSTRACT

A driving tool includes: a striking unit striking a fastener by being actuated in a first direction; a rack on the striking unit; a wheel; and a second transmission portion on the wheel and capable of being engaged with and released from the rack. The striking unit can be actuated in a second direction when the second transmission portion is engaged with the rack, and the striking unit can be actuated in the first direction when the second transmission portion is released from the rack. The second transmission portion includes: a tooth portion arranged along a rotation direction of the wheel and turned in a predetermined direction to be engaged with and released from the rack; and a movable piece actuated in the predetermined direction to be engaged with the rack and actuated in a different direction from the predetermined direction to be released from the rack.

17 Claims, 14 Drawing Sheets

(56) References Cited

U.S. PATENT DOCUMENTS

| | | | | |
|---|---|---|---|---|
| 10,821,586 | B2 | 11/2020 | Wu et al. | |
| 11,207,768 | B2 | 12/2021 | Enta et al. | |
| 2009/0188766 | A1* | 7/2009 | Shima | B25C 1/047 173/217 |
| 2016/0229043 | A1 | 8/2016 | Wyler et al. | |
| 2016/0288305 | A1 | 10/2016 | Mccardle et al. | |
| 2017/0190037 | A1 | 7/2017 | Sato et al. | |
| 2018/0126528 | A1 | 5/2018 | Pomeroy et al. | |
| 2018/0154505 | A1 | 6/2018 | Sato et al. | |
| 2019/0126453 | A1 | 5/2019 | Po | |
| 2019/0321955 | A1* | 10/2019 | Carrier | B25C 1/04 |
| 2020/0164498 | A1* | 5/2020 | Wechselberger | B25C 1/047 |
| 2020/0338708 | A1 | 10/2020 | Po | |
| 2021/0008701 | A1 | 1/2021 | Tan et al. | |
| 2021/0031347 | A1 | 2/2021 | Sato et al. | |
| 2021/0138622 | A1* | 5/2021 | Enta | B25C 1/047 |
| 2022/0339767 | A1* | 10/2022 | Zhu | B25C 1/047 |
| 2023/0249324 | A1* | 8/2023 | Bierdeman | B25C 1/008 227/130 |

OTHER PUBLICATIONS

Notice of Allowance issued in the corresponding U.S. Appl. No. 17/270,183 dated Nov. 8, 2023.

Final Office Action issued in the corresponding U.S. Appl. No. 17/270,183 dated May 23, 2023.

Non-Final Office Action issued in the corresponding U.S. Appl. No. 17/270,183 dated Aug. 16, 2022.

Extended European Search Report issued in corresponding EP Application No. 19861758.1, dated Nov. 25, 2021.

* cited by examiner

DRIVING TOOL WITH ROTATING MEMBER TO MOVE STRIKING UNIT

This application is a Continuation of U.S. patent application Ser. No. 17/270,183, filed on Feb. 22, 2021, which is the U.S. National Phase under 35 U.S.C. § 371 of International Application No. PCT/JP2019/036146, filed on Sep. 13, 2019, which claims the benefit of Japanese Patent Application No. 2018-176893, dated Sep. 21, 2018, and the entire contents of each are hereby incorporated by reference in their entirety.

TECHNICAL FIELD

The present invention relates to a driving tool including a striking unit configured to strike a fastener.

BACKGROUND ART

A conventional driving tool including a striking unit configured to strike a fastener is described in Patent Document 1. The driving tool described in Patent Document 1 includes an electric motor, a striking unit, a pressure accumulation chamber, a power mechanism, an ejection unit, a magazine, a battery, a controller, and a trigger. The striking unit has a piston that receives a pressure of the pressure accumulation chamber and a driver blade fixed to the piston. The driver blade has a rack as a first transmission portion. The rack is composed of a plurality of protrusions. The power mechanism has a wheel and a second transmission portion. The wheel is rotated by a rotational force of the electric motor. The second transmission portion has a plurality of engaging portions provided along a rotation direction of the wheel. Nails are provided from the magazine to the ejection unit.

When an operation force is applied to the trigger in the driving tool described in Patent Document 1, the controller supplies the power of the battery to the electric motor, so that the electric motor is rotated. When the wheel is rotated by the rotational force of the electric motor and the engaging portions provided on the wheel are engaged with the protrusions provided on the driver blade, the striking unit is actuated toward the top dead center. When the engaging portions provided on the wheel are released from the protrusions provided on the driver blade, the striking unit is actuated toward the bottom dead center by the pressure of the pressure accumulation chamber, and the driver blade strikes the nail of the ejection unit.

RELATED ART DOCUMENTS

Patent Documents

Patent Document 1: International Publication No. WO2016-199670

SUMMARY OF THE INVENTION

Problem to be Solved by the Invention

The inventors of the present invention have found the problem that the load on at least one of the first transmission portion and the second transmission portion increases in the process of releasing the second transmission portion from the first transmission portion.

An object of the present invention is to provide a driving tool capable of suppressing the increase in the load on at least one of the first transmission portion and the second transmission portion.

Means for Solving the Problems

A driving tool according to an embodiment includes: a striking unit capable of being actuated in a first direction and a second direction opposite to the first direction and capable of striking a fastener by being actuated in the first direction; a first transmission portion provided on the striking unit; a rotating member configured to be rotated in a predetermined direction; and a second transmission portion provided on the rotating member and capable of being engaged with and released from the first transmission portion, the striking unit can be actuated in the second direction when the second transmission portion is engaged with the first transmission portion and the striking unit can be actuated in the first direction when the second transmission portion is released from the first transmission portion, the second transmission portion includes: a first engaging portion arranged along a rotation direction of the rotating member and turned in a predetermined direction to be engaged with the first transmission portion, thereby actuating the striking unit in the second direction; and a second engaging portion actuated in the predetermined direction to be engaged with the first transmission portion and actuated in a different direction from the predetermined direction to be released from the first transmission portion, the second engaging portion is actuated in the different direction by a load received from the first transmission portion to be released from the first transmission portion, and a return mechanism configured to return the second engaging portion released from the first transmission portion to an initial position is provided.

Effects of the Invention

The driving tool according to an embodiment can suppress the increase in the load on at least one of the first transmission portion and the second transmission portion.

DETAILED DESCRIPTION OF PREFERRED EMBODIMENTS

The driving tool according to a typical embodiment of the present invention will be described with reference to the drawings.

Figure 1:
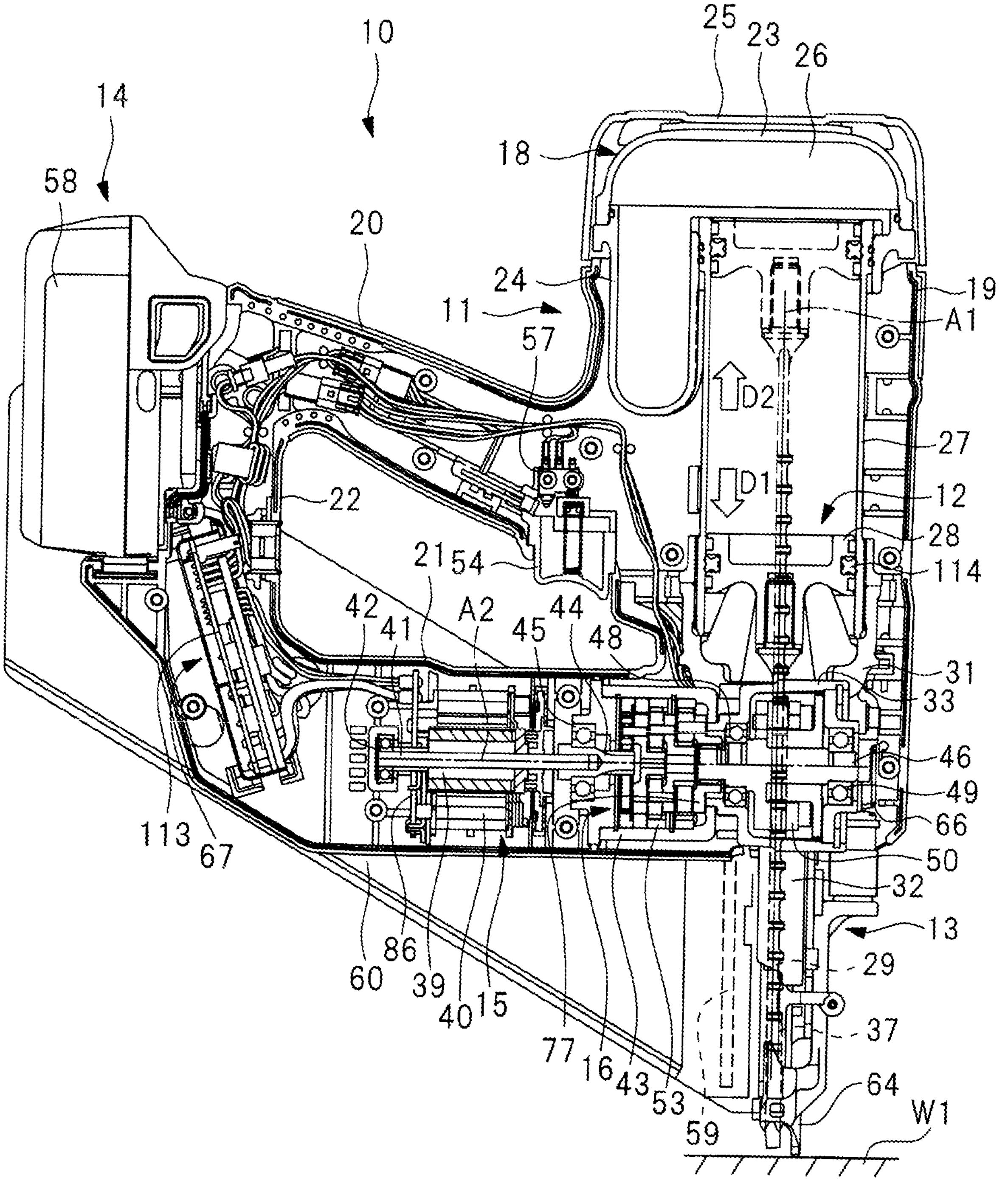
FIG. 1 is a side cross-sectional view showing a driving tool according to an embodiment of the present invention.
Figure 2A:
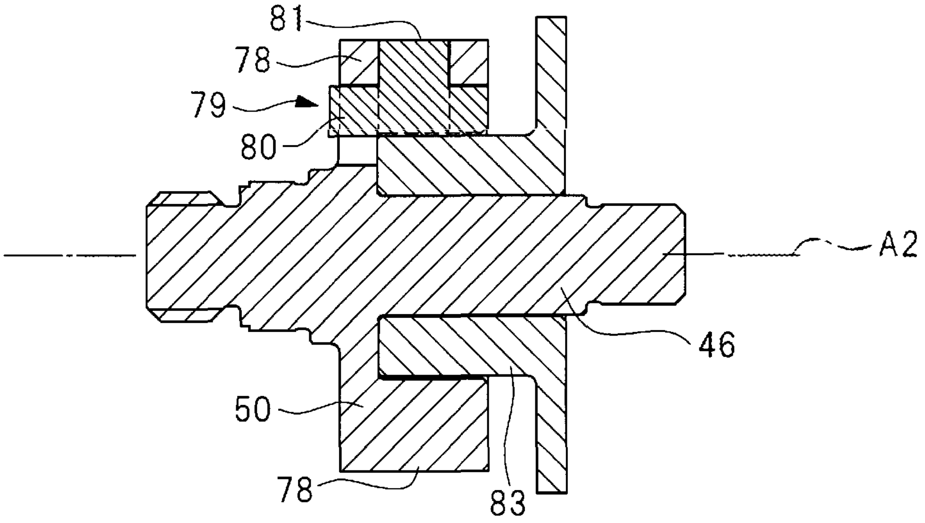
FIG. 2(A) is a side cross-sectional view showing a principal part of the driving tool.

A driving tool 10 shown in FIG. 1 and FIG. 2 includes a housing 11, a striking unit 12, a nose unit 13, a power source unit 14, an electric motor 15, a deceleration mechanism 16, a conversion unit 17, and a pressure accumulation container 18. The housing 11 is an outer shell element of the driving tool 10, and the housing 11 includes a cylinder case 19, a handle 20 connected to the cylinder case 19, a motor case 21 connected to the cylinder case 19, and a mounting unit 22 connected to the handle 20 and the motor case 21.

The power source unit 14 is detachably attached to the mounting unit 22. The electric motor 15 is arranged in the motor case 21. The pressure accumulation container 18 includes a cap 23 and a holder 24 to which the cap 23 is attached. A head cover 25 is attached to the cylinder case 19, and the pressure accumulation container 18 is arranged across the inside of the cylinder case 19 and the inside of the head cover 25.

A cylinder 27 is housed in the cylinder case 19. The cylinder 27 is made of metal, for example, aluminum alloy or iron. The cylinder 27 is positioned with respect to the cylinder case 19 in the direction of a center line A1 and the radial direction. A pressure chamber 26 is formed across the inside of the pressure accumulation container 18 and the inside of the cylinder 27. The pressure chamber 26 is filled with compressible gas. As the compressible gas, inert gas can be used in addition to air. Examples of the inert gas include nitrogen gas and rare gas. In this embodiment, an example in which the pressure chamber 26 is filled with air will be described.

The striking unit 12 is arranged across the inside to the outside of the housing 11. The striking unit 12 includes a piston 28 and a driver blade 29. The piston 28 can be actuated in the cylinder 27 in the direction of the center line A1. A sealing member 114 is attached to an outer peripheral surface of the piston 28. An outer peripheral surface of the sealing member 114 is in contact with an inner peripheral surface of the cylinder 27 to form a sealing surface.

The driver blade 29 is made of, for example, metal. The piston 28 and the driver blade 29 are provided as separate members, and the piston 28 and the driver blade 29 are coupled to each other. The driver blade includes a rack 84 shown in FIG. 3(A). The rack 84 has a plurality of protrusions 85 arranged at intervals in the direction of the center line A1. The striking unit 12 can be actuated in the direction of the center line A1.

The nose unit 13 is arranged across the inside and outside of the cylinder case 19. The nose unit 13 includes a bumper support portion 31, an ejection unit 32, and a tubular portion 33. The bumper support portion 31 has a tubular shape and has a guide hole 34. The guide hole 34 is arranged to be centered about the center line A1.

A bumper 35 is arranged in the bumper support portion 31. The bumper 35 may be made of synthetic rubber or silicone rubber. The bumper 35 has an annular shape and has a guide hole 36. The guide hole 36 is provided to be centered about the center line A1. The driver blade 29 can be actuated in the guide holes 34 and 36 in the direction of the center line A1. The bumper 35 is elastically deformed by receiving a load from the piston 28.

The ejection unit 32 is connected to the bumper support portion 31 and protrudes from the bumper support portion 31 in the direction of the center line A1. The ejection unit 32 includes an ejection path 37 and the ejection path 37 is provided along the center line A1. The driver blade 29 is movable in the ejection path 37 in the direction of the center line A1.

As shown in FIG. 1, the electric motor 15 is arranged in the motor case 21. The electric motor 15 includes a rotor 39 and a stator 40. The stator 40 is attached to the motor case 21. The rotor 39 is attached to a rotor shaft 41 and a first end portion of the rotor shaft 41 is rotatably supported by the motor case 21 via a bearing 42. The electric motor 15 is a brushless motor, and the rotor 39 can rotate forward and backward when a voltage is applied to the electric motor 15.

A gear case 43 is provided in the motor case 21. The gear case 43 has a tubular shape and is arranged to be centered about a center line A2. The deceleration mechanism 16 is provided in the gear case 43. The deceleration mechanism 16 includes plural sets of planetary gear mechanisms.

An input element of the deceleration mechanism 16 is coupled to the rotor shaft 41 via a power transmission shaft 44. The power transmission shaft 44 is rotatably supported by a bearing 45. A rotating shaft 46 is provided in the tubular portion 33. The rotating shaft 46 is rotatably supported by bearings 48 and 49. The rotor shaft 41, the power transmission shaft 44, the deceleration mechanism 16, and the rotating shaft 46 are arranged concentrically about the center line A2. An output element 77 of the deceleration mechanism 16 and the rotating shaft 46 are arranged concentrically, and the output element 77 and the rotating shaft 46 are rotated integrally. The deceleration mechanism 16 is arranged on a power transmission path extending from the electric motor 15 to the rotating shaft 46.

The conversion unit 17 is provided in the tubular portion 33. The conversion unit 17 is configured to convert a rotational force of the rotating shaft 46 into an actuation force of the striking unit 12.

First Example of Conversion Unit

Figure 3A:
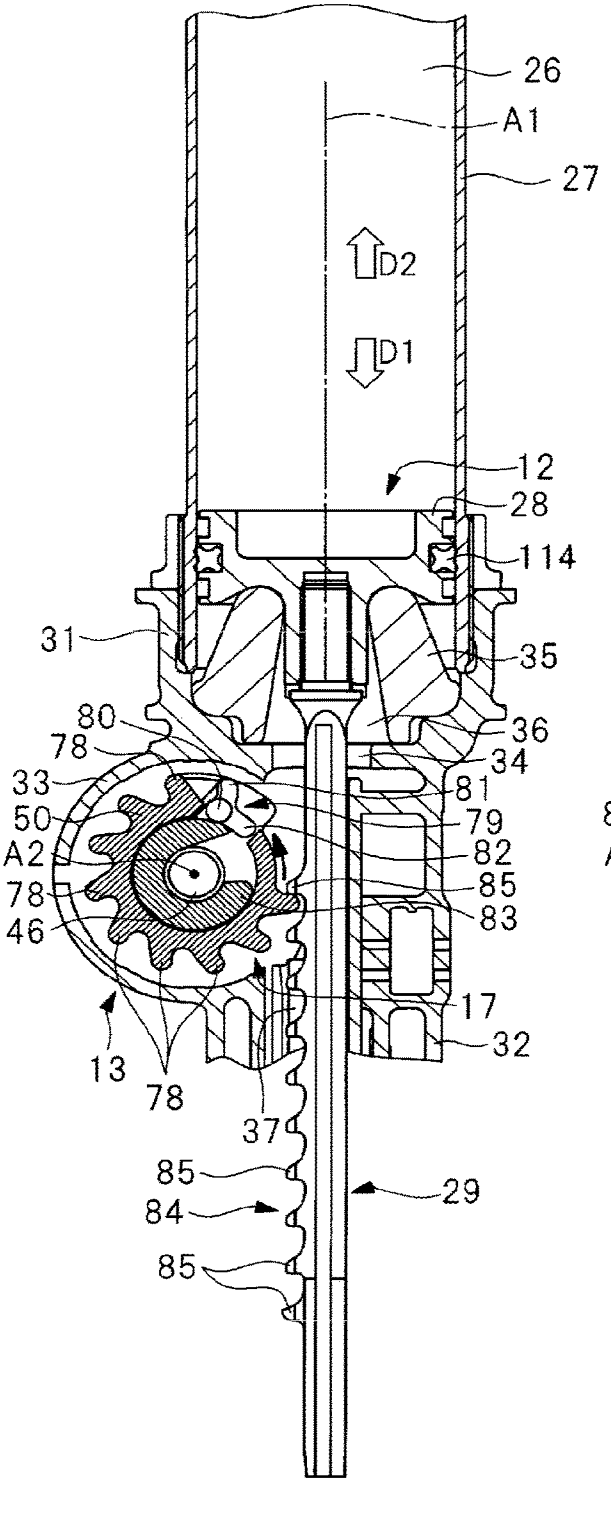
FIGS. 3(A) and 3(B) are diagrams showing a first half of an actuation process in the first example of a conversion unit provided in the driving tool of FIG. 1.

As shown in FIG. 3(A), the conversion unit 17 includes a wheel 50 fixed to the rotating shaft 46 and tooth portions 78 formed on an outer peripheral surface of the wheel 50. For example, the wheel 50 and the tooth portions 78 are integrally molded with a metal material. A plurality of tooth portions 78 are provided at intervals in the rotation direction of the wheel 50. The tooth portions 78 are arranged within a range of a predetermined angle in the rotation direction of the wheel 50, for example, within a range of 270 degrees.

Figure 2B:
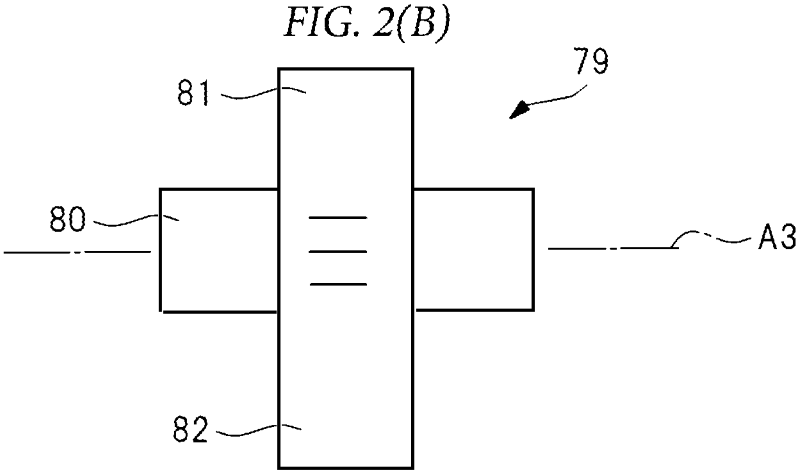
FIG. 2(B) is a side view showing a movable piece provided on a wheel.

Also, a movable piece 79 is attached to the wheel 50. The movable piece 79 is provided outside the range where the plurality of tooth portions 78 are arranged in the rotation direction of the wheel 50. The movable piece 79 can be actuated within a range of a predetermined angle about a support shaft 80. The movable piece 79 includes an engaging portion 81 and a contact portion 82. The movable piece 79 is made of, for example, metal. As shown in FIG. 2(B), the engaging portion 81 and the contact portion 82 are provided in the same range in the direction of a center line A3 of the support shaft 80. The center line A3 is parallel to the center line A2.

A guide portion 83 shown in FIG. 3(A) is arranged outside the rotating shaft 46 in the radial direction of the wheel 50. The guide portion 83 is provided so as not to be rotated. The guide portion 83 is provided within a range of a predetermined angle in the rotation direction of the wheel 50. The outer peripheral surface of the guide portion 83 has an arc shape to be centered about the center line A2. The guide portion 83 is arranged on an inner side than the support shaft 80 in the radial direction of the wheel 50.

When the wheel 50 is rotated counterclockwise in FIG. 3(A) and at least one of the tooth portions 78 is engaged with the protrusion 85, the striking unit 12 shown in FIG. 1 is actuated in a second direction D2, that is, moves upward by the rotational force of the wheel 50.

When the wheel 50 is rotated, the contact portion 82 comes into contact with the outer peripheral surface of the guide portion 83 within the range where the guide portion 83 is arranged in the rotation direction of the wheel 50. When the contact portion 82 is in contact with the outer peripheral surface of the guide portion 83, a circumscribed circle of the engaging portion 81 is common to a circumscribed circle of the tooth portion 78. Namely, the engaging portion 81 can be engaged with the protrusion 85. When the wheel 50 is rotated and the engaging portion 81 is engaged with the protrusion 85, the striking unit 12 is actuated in the second direction D2.

When the tooth portion 78 is released from the protrusion 85, the rotational force of the wheel 50 is not transmitted from the tooth portion 78 to the striking unit 12. Also, the contact portion 82 is separated from the outer peripheral surface of the guide portion 83 outside the range where the guide portion 83 is formed in the rotation direction of the wheel 50. When the contact portion 82 is separated from the outer peripheral surface of the guide portion 83, the movable piece 79 is actuated clockwise in FIG. 4(B) by receiving a load from the protrusion 85, and the engaging portion 81 is released from the protrusion 85. Therefore, the rotational force of the wheel 50 is not transmitted to the striking unit 12.

The striking unit 12 is constantly biased in a first direction D1 by the pressure of the pressure chamber 26 shown in FIG. 1. The actuation of the striking unit 12 in the second direction D2 in FIG. 1 is defined as upward movement. The first direction D1 and the second direction D2 are parallel to the center line A1, and the second direction D2 is opposite to the first direction D1. The striking unit 12 is actuated in the second direction D2 against the pressure of the pressure chamber 26. The actuation of the striking unit 12 in the first direction D1 by the pressure of the pressure chamber 26 is defined as downward movement.

As shown in FIG. 1, a rotation preventive mechanism 53 is provided in the gear case 43. The rotation preventive mechanism 53 enables the rotating shaft 46 to rotate counterclockwise in FIG. 3(A) by the rotational force of the electric motor 15 rotating forward. The rotation preventive mechanism 53 prevents the clockwise rotation of the rotating shaft 46 in FIG. 3(B) when the actuation force of the striking unit 12 in the first direction D1 is transmitted to the wheel 50.

As shown in FIG. 1, a trigger 54 and a trigger sensor 57 are provided in the handle 20. The trigger sensor 57 detects the presence or absence of an operation force applied to the trigger 54, and outputs a signal in accordance with the detection result.

The power source unit 14 includes a storage case 58 and a plurality of battery cells stored in the storage case 58. The battery cell is a secondary battery that can be charged and discharged, and a known battery cell such as a lithium ion battery, a nickel hydrogen battery, a lithium ion polymer battery, or a nickel cadmium battery can be used as the battery cell as appropriate.

Also, a magazine 60 is provided as shown in FIG. 1, and the magazine 60 is supported by the ejection unit 32 and the mounting unit 22. The magazine 60 stores a plurality of nails 59. The magazine 60 includes a feeder, and the feeder feeds the nails 59 in the magazine 60 to the ejection path 37.

The ejection unit 32 is made of metal or synthetic resin. A push lever 64 is attached to the ejection unit 32. The push lever 64 can be actuated with respect to the ejection unit 32 within a predetermined range in the direction of the center line A1. An elastic member 66 for biasing the push lever 64 in the direction of the center line A1 is provided. The elastic member 66 is, for example, a compression spring, and the elastic member 66 biases the push lever 64 in the direction away from the bumper support portion 31. The push lever 64 is stopped by coming into contact with a stopper.

A control unit 67 is provided in the mounting unit 22. The control unit 67 includes a microprocessor mounted on a substrate 113. The microprocessor includes an input/output interface, a control circuit, an arithmetic processing unit, and a memory unit.

Further, a motor substrate 86 is provided in the motor case 21. An inverter circuit is provided on the motor substrate 86. The inverter circuit connects and disconnects the stator 40 of the electric motor 15 and the power source unit 14. The inverter circuit includes a plurality of switching elements, and the plurality of switching elements can be independently turned on and off. The control unit 67 controls the inverter circuit, thereby controlling the rotation and stop of the electric motor 15, the number of rotations of the electric motor 15, and the rotation direction of the electric motor 15.

Also, a push sensor and a position detection sensor are provided in the housing 11. The push sensor detects whether the push lever 64 is pressed to a workpiece W1, and outputs a signal based on the detection. The position detection sensor detects the position of the wheel 50 in the rotation direction, and outputs a signal based on the detection. Further, a velocity sensor that detects the rotation speed of the rotor 39 of the electric motor 15 and a phase sensor that detect a phase of the rotor in the rotation direction are provided.

Signals output from the trigger sensor 57, the push sensor, the position detection sensor, and the phase sensor are input to the control unit 67. The control unit 67 controls the inverter circuit by processing the input signals. In this manner, the control unit 67 controls the stop, the rotation, the rotation direction, and the rotation speed of the electric motor 15.

Next, an example of using the driving tool 10 will be described. When the control unit 67 detects at least one of the fact that the operation force is not applied to the trigger 54 and the fact that the push lever 64 is not pressed to the workpiece W1, it stops the power supply to the electric motor 15. Thus, the electric motor 15 is stopped and the striking unit 12 is stopped at a standby position. In the description of this embodiment, the standby position of the striking unit 12 is defined as the state where the piston 28 is in contact with the bumper 35 as shown in FIG. 3(A), that is, the bottom dead center. The pressure of the pressure chamber 26 is constantly applied to the striking unit 12, and the striking unit 12 is biased in the first direction D1. When the striking unit 12 is stopped at the standby position, the contact portion 82 is in contact with the outer peripheral surface of the guide portion 83.

When the control unit 67 detects that the operation force is applied to the trigger 54 and that the push lever 64 is pressed to the workpiece W1, it causes the power source unit 14 to apply a voltage to the electric motor 15, thereby rotating the electric motor 15 forward. The rotational force of the electric motor 15 is transmitted to the rotating shaft 46 via the deceleration mechanism 16. Then, the rotating shaft 46 and the wheel 50 are rotated counterclockwise in FIG. 3(A). The deceleration mechanism 16 makes the rotation speed of the wheel 50 slower than the rotation speed of the electric motor 15.

Figure 3B:
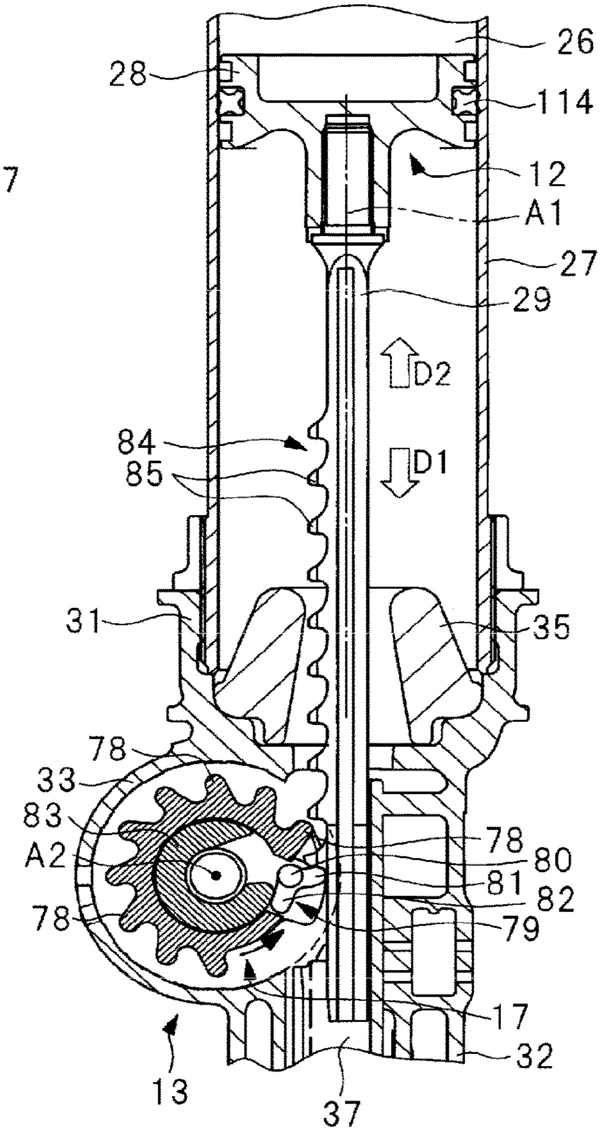
Figures 4A, 4B:
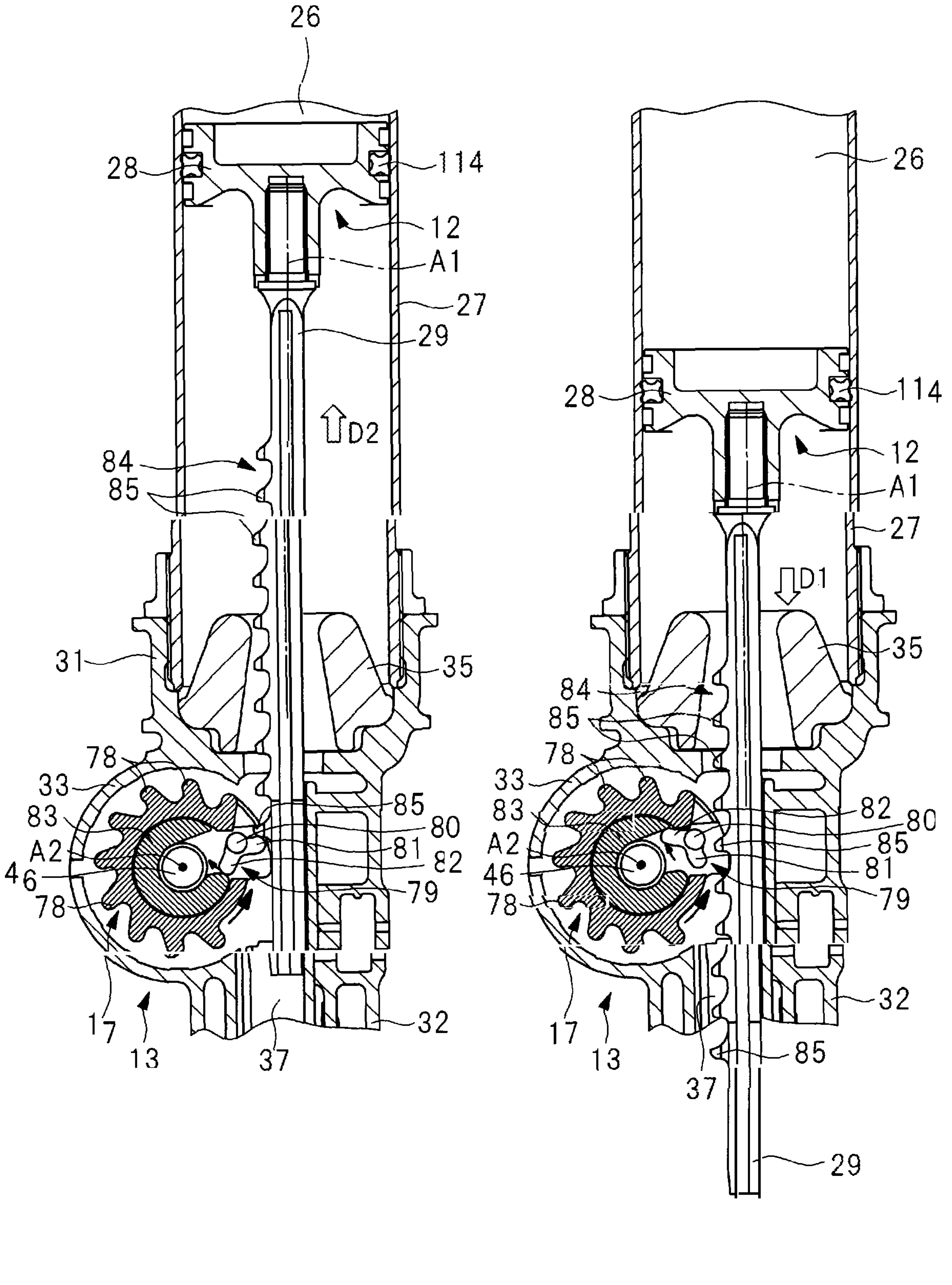
FIGS. 4(A) and 4(B) are cross-sectional views showing a second half of the actuation process in the first example of the conversion unit.

When at least one tooth portion 78 is engaged with the protrusion 85, the rotational force of the wheel 50 is transmitted to the striking unit 12, and the striking unit 12 moves upward. When the striking unit 12 moves upward, the pressure of the pressure chamber 26 increases. By the rotation of the wheel 50, the plurality of tooth portions 78 are respectively engaged with and released from the protrusions 85. Then, after the engaging portion 81 of the movable piece 79 is engaged with the protrusion 85 as shown in FIG. 3(B), the striking unit 12 continues to move upward in the state where all the tooth portions 78 are released from the protrusions 85. Before the striking unit 12 reaches the top dead center, the contact portion 82 of the movable piece 79 is separated from the guide portion 83 as shown in FIG. 4(A). Then, the movable piece 79 is actuated clockwise in FIG. 4(A) by the force applied to the engaging portion 81 from the protrusion 85 of the driver blade 29. As a result, the engaging portion 81 is released from the protrusion 85, and the striking unit 12 moves downward from the top dead center by the pressure of the pressure chamber 26 as shown in FIG. 4(B). When the striking unit 12 moves downward, the driver blade 29 strikes the nail 59 located in the ejection path 37, and the nail 59 is driven into the workpiece W1.

Also, the piston 28 collides with the bumper 35 after the nail 59 is driven into the workpiece W1. The bumper 35 is elastically deformed by receiving a load in the direction of the center line A1, and the bumper 35 absorbs a part of the kinetic energy of the striking unit 12. The control unit 67 stops the electric motor 15 when the striking unit 12 reaches the bottom dead center.

The load in the direction of the center line A1 that the striking unit 12 receives from the pressure chamber 26 is maximum when the striking unit 12 is located at the top dead center. Then, when the contact portion 82 of the movable piece 79 is separated from the outer peripheral surface of the guide portion 83, the movable piece 79 is actuated clockwise in FIG. 4(A) by the force of the driver blade 29, and the engaging portion 81 is released from the protrusion 85. Namely, the engaging portion 81 moves to the outside of the actuation region of the protrusion 85 of the driver blade 29.

Therefore, it is possible to suppress the increase in the frictional force at the contact point between the engaging portion 81 and the protrusion 85 in the process in which the striking unit 12 receives the maximum load and the engaging portion 81 is separated from the protrusion 85. Accordingly, the abrasion of at least one of the engaging portion 81 and the protrusion 85 can be reduced, and the product life of at least one of the movable piece 79 and the driver blade 29 can be improved.

In addition, if the movable piece 79 is designed to be independently attachable and detachable with respect to the wheel 50, what is required when the engaging portion 81 is worn out is just to exchange the movable piece 79, and it is not necessary to exchange the overall wheel 50.

Further, as shown in FIG. 2(B), the engaging portion 81 and the contact portion 82 are provided in the same range in the direction of the center line A3 of the support shaft 80. Therefore, it is possible to suppress the support shaft 80 from being inclined with respect to the center line A3 when the contact portion 82 is in contact with the guide portion 83 and the engaging portion 81 is engaged with the protrusion 85.

Figure 2C:
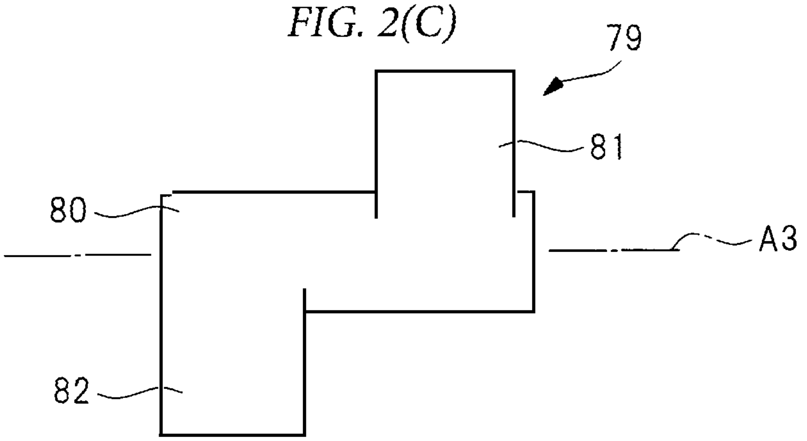
FIG. 2(C) is a side view showing a modification of the movable piece provided on the wheel.

FIG. 2(C) shows a modification of the movable piece 79. In the movable piece 79 shown in FIG. 2(C), an arrangement range of the engaging portion 81 and an arrangement range of the contact portion 82 differ in the direction of the center line A3. The actuation principle of the movable piece 79 shown in FIG. 2(C) is the same as the actuation principle of the movable piece 79 shown in FIG. 2(B).

Figure 5A:
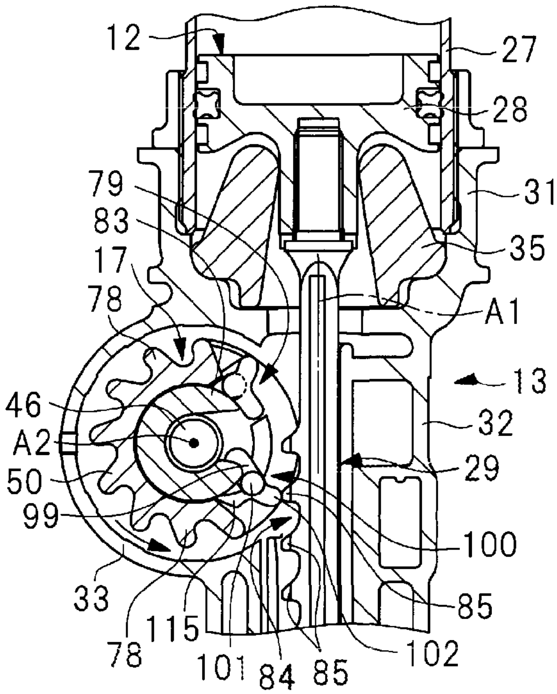
FIGS. 5(A), 5(B), 5(C), and 5(D) are cross-sectional views showing an actuation process in the first example of the conversion unit having another configuration.

FIG. 5(A) shows the first example of the conversion unit 17 having another configuration. In the configuration of FIG. 5(A), the same configurations as those of FIG. 3(A) are designated by the same reference characters as those of FIG. 3(A).

A groove 99 is provided in the wheel 50. The groove 99 is provided at a position where the tooth portion 78 is not provided in the rotation direction of the wheel 50. The groove 99 is provided along the radial direction of the wheel 50 and toward the center line A2. A movable piece 100 is attached to the wheel 50. The movable piece 100 includes a pin 101, a tooth portion 102, and a contact portion 115.

The pin 101 is arranged in the groove 99 and can move in the groove 99 along the radial direction of the wheel 50 and in the direction toward and away from the center line A2. Further, the pin 101 is biased outward in the radial direction of the wheel 50 by a biasing member. Although the biasing member is not shown, for example, a metal torsion spring can be used. Therefore, the movable piece 100 can move within the range of the groove 99 in the radial direction of the wheel 50, and can be rotated within a range of a predetermined angle about the pin 101.

If the nail 59 is stuck in the ejection path 37 while using the driving tool 10, the striking unit 12 is stopped between the bottom dead center and the top dead center. Namely, the striking unit 12 is stopped in the state where the piston 28 is separated from the bumper 35. Then, when the striking unit 12 is moved in the direction D2 by the wheel 50 of the conversion unit 17, a tip of the tooth portion 102 is pressed to a tip of the protrusion 85 in some cases as shown in FIG. 5(A). Note that the contact portion 115 is in contact with the outer peripheral surface of the guide portion 83.

Figure 5B:
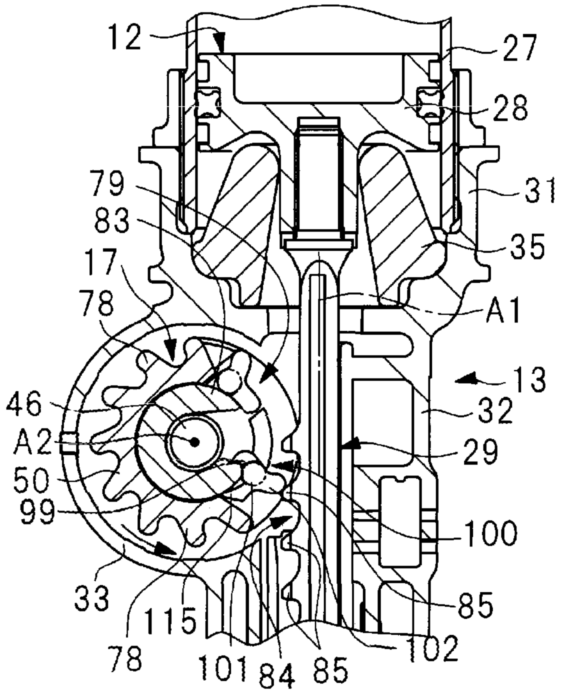

In the driving tool 10 according to this embodiment, when the wheel 50 is rotated counterclockwise, the pin 101 is biased toward the inner side in the radial direction of the wheel 50 by the reaction force of the tooth portion 102 pressed to the protrusion 85, and the pin 101 moves in the groove 99 toward the inner side in the radial direction of the wheel 50 against the biasing force of the biasing member as shown in FIG. 5(B).

Figure 5C:
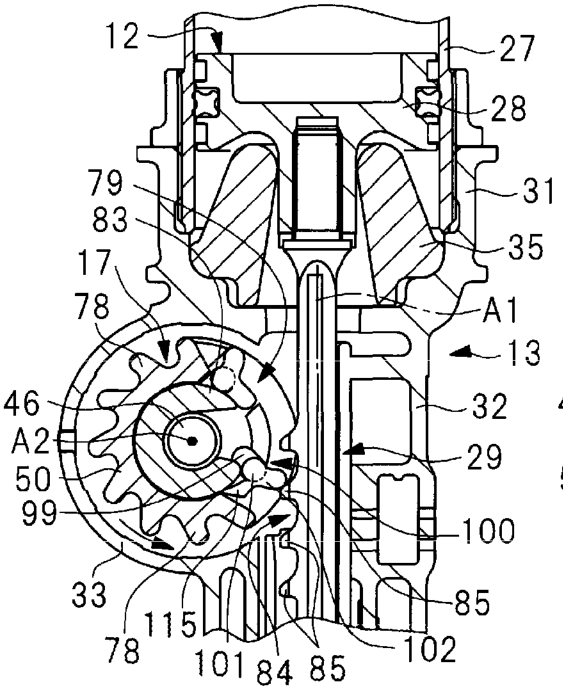
Figure 5D:
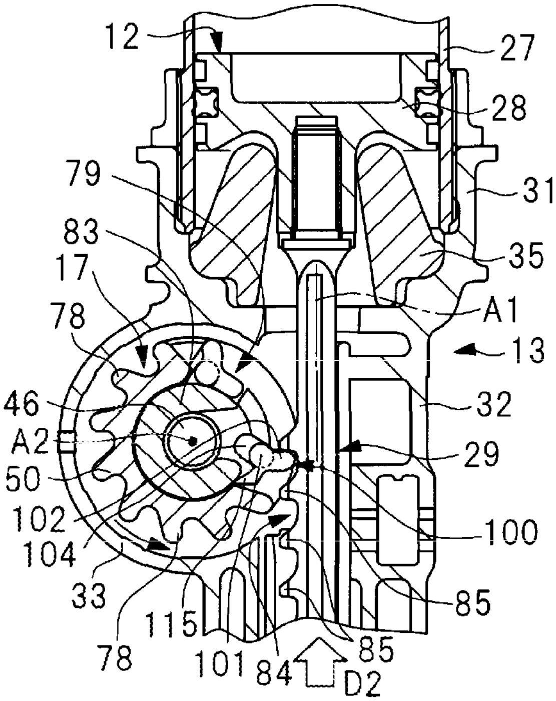

Also, the tip of the tooth portion 102 slides in the state of being in contact with the tip of the protrusion 85, and when the tip of the tooth portion 102 gets over the tip of the protrusion 85, the pin 101 is pressed by the biasing force of the biasing member, so that the tip of the tooth portion 102 moves between the protrusion 85 and the protrusion 85 as shown in FIG. 5(C). Further, when the tooth portion 102 is engaged with the protrusion 85 by the rotation of the wheel 50 as shown in FIG. 5(D), the driver blade 29 is actuated in the second direction D2. As described above, even in such a case where the nail 59 is stuck in the ejection path 37 while using the driving tool 10, the protrusion 85 of the driver blade 29 can be engaged with the tooth portion 102 regardless of the position of the driver blade 29 in the direction of the center line A1, and the driver blade 29 can be actuated in the second direction D2. Therefore, the worker can remove the stuck nail 59 from the ejection path 37.

Note that, when the contact portion 115 is separated from the outer peripheral surface of the guide portion 83, the next tooth portion 78 and the protrusion 85 are engaged with each other, and the engagement between the tooth portion 102 of the movable piece 100 and the protrusion 85 is released. As described above, when the wheel 50 starts rotating, the tooth portion 102 of the movable piece 100 is first engaged with the protrusion 85. Therefore, even in the case where the tip of the tooth portion 102 comes into contact with the tip of the protrusion 85, the tooth 78 and the protrusion 85 can be normally engaged with each other.

Second Example of Conversion Unit

The second example of the conversion unit 17 is shown FIG. 6(A), FIG. 6(B), FIG. 7(A), FIG. 7(B), FIG. 8(A), and FIG. 8(B).

Figure 8B:
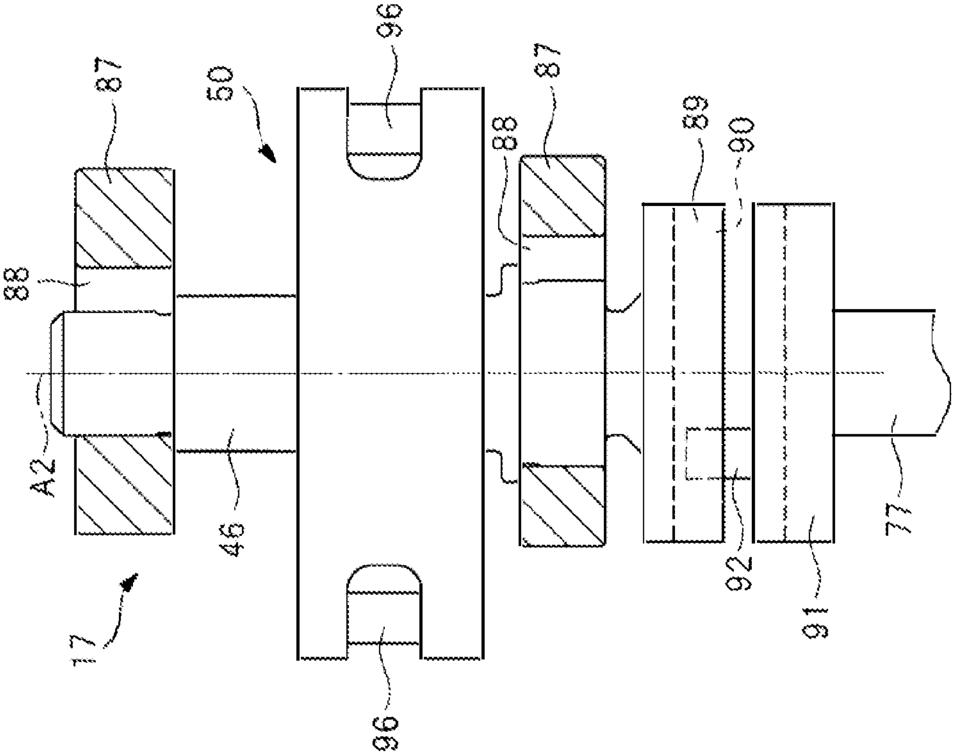
FIGS. 8(A) and 8(B) are planar cross-sectional views of the second example of the conversion unit.
Figure 8A:
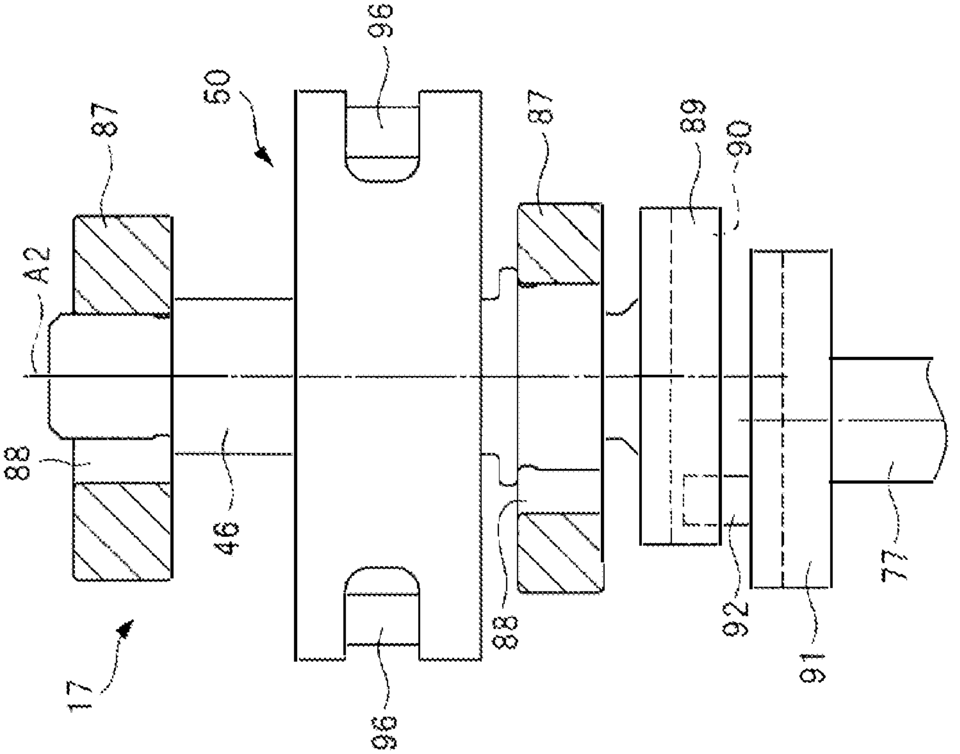

The rotating shaft 46 is rotatably supported by two support portions 87. The two support portions 87 are fixed to the ejection unit, and the two support portions 87 each have a non-circular support hole 88. The two support portions 87 are arranged at intervals in the direction of the center line A2. A part of the rotating shaft 46 in the longitudinal direction is arranged in each of the two support holes 88. As shown in FIG. 8(A) and FIG. 8(B), the rotating shaft 46 can move in the two support holes 88 in the direction intersecting the center line A2. The rotating shaft 46 has a boss portion 89, and the boss portion 89 has a linear groove 90 passing through the center line A2.

The output element 77 has a boss portion 91, and the boss portion 91 has a pin 92. The pin 92 is provided at a position eccentric from the center line A2. The tip of the pin 92 is arranged in the groove 90. When the output element 77 is rotated, the pin 92 moves along the groove 90, and the rotating shaft 46 is rotated. Further, the rotating shaft 46 moves in the support hole 88 in the direction intersecting the center line A2. Namely, the wheel 50 can move in the direction intersecting the center line A2. When the wheel 50 moves in the direction intersecting the center line A2, the wheel 50 approaches or separates from the driver blade 29.

Further, a positioning member 93 is provided in the tubular portion 33. The positioning member 93 can be elastically deformed. The positioning member 93 is, for example, a metal leaf spring, and both ends of the positioning member 93 are held by the tubular portion 33. The positioning member 93 does not move in either the direction intersecting the center line A1 or the direction of the center line A1. The positioning member 93 has a preventive portion 94 protruding toward the rotating shaft 46. The positioning member 93 is pressed to the outer peripheral surface of the rotating shaft 46. When the force of the rotating shaft 46 being actuated in the direction intersecting the center line A2 is equal to or less than a predetermined value, the preventive portion 94 is pressed to the rotating shaft 46, so that the rotating shaft 46 is prevented from moving in the support hole 88.

When the force of the rotating shaft 46 being actuated in the direction intersecting the center line A2 is more than the predetermined value, the positioning member 93 is elastically deformed and the rotating shaft 46 gets over the preventive portion 94, so that the rotating shaft 46 can move in the support hole 88.

In addition, a return portion 95 protruding from an inner surface of the tubular portion is provided. The wheel 50 has a plurality of pins 96 arranged on the same circumference centered about the rotating shaft 46. The plurality of pins 96 are made of, for example, metal and are fixed to the wheel 50, respectively. The plurality of pins 96 are arranged at equal intervals in the rotation direction of the wheel 50. The number of the plurality of pins 96 is larger than the number of the protrusions 85.

The driver blade 29 has a biasing portion 97. The biasing portion 97 is provided between the protrusion 85 provided at the position closest to the tip of the driver blade 29 in the direction of the center line A1 among the plurality of protrusions 85 and the tip of the driver blade 29. The biasing portion 97 is a flat surface along the direction of the center line A1. Note that the tips of the plurality of protrusions 85 are curved.

Figure 6B:
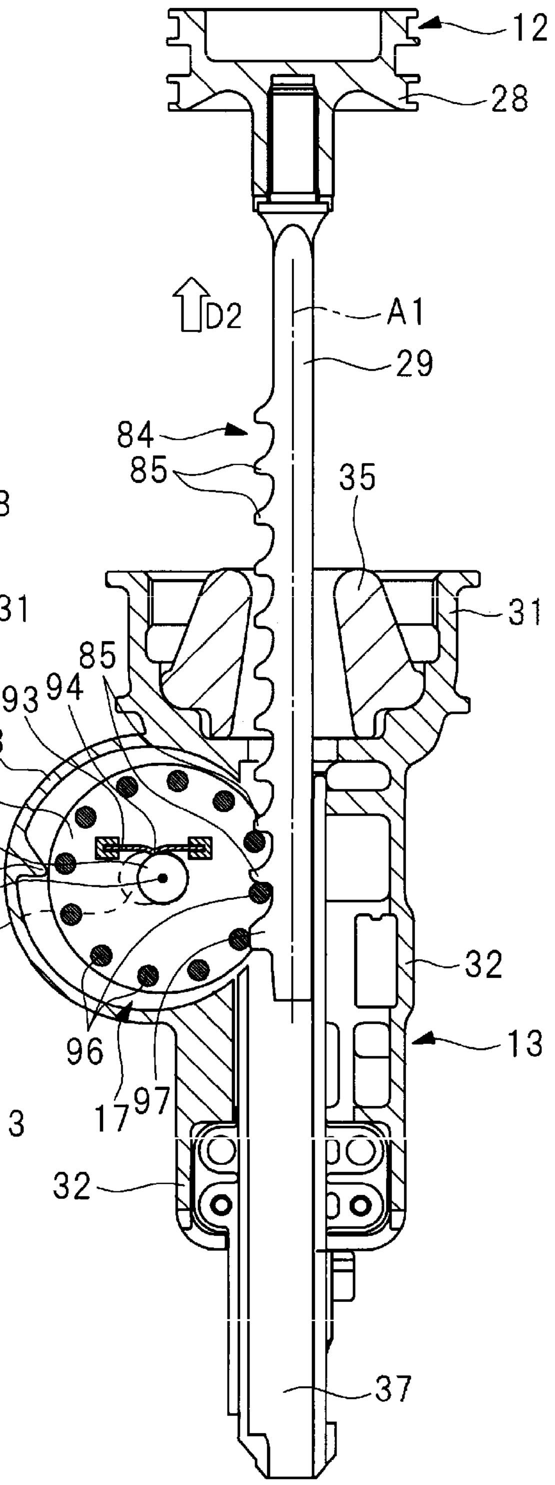
FIGS. 6(A) and 6(B) are cross-sectional views showing a first half of an actuation process in the second example of the conversion unit provided in the driving tool of FIG. 1.
Figure 6A:
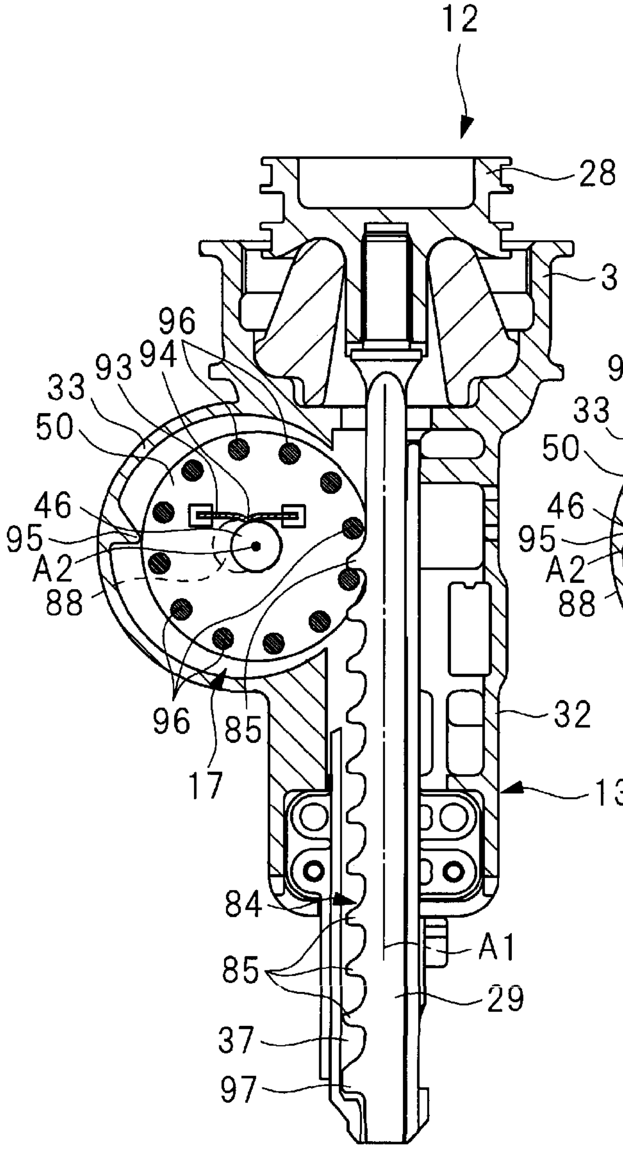

In the state where the striking unit 12 is stopped at the standby position and the electric motor 15 is stopped, the rotating shaft 46 and the wheel 50 are stopped at the initial position as shown in FIG. 6(A). Namely, the rotating shaft 46 and the wheel 50 are stopped at the position closest to the driver blade 29 in the direction intersecting the center line A2. Further, all the pins 96 are separated from the return portion 95.

Figure 7A:
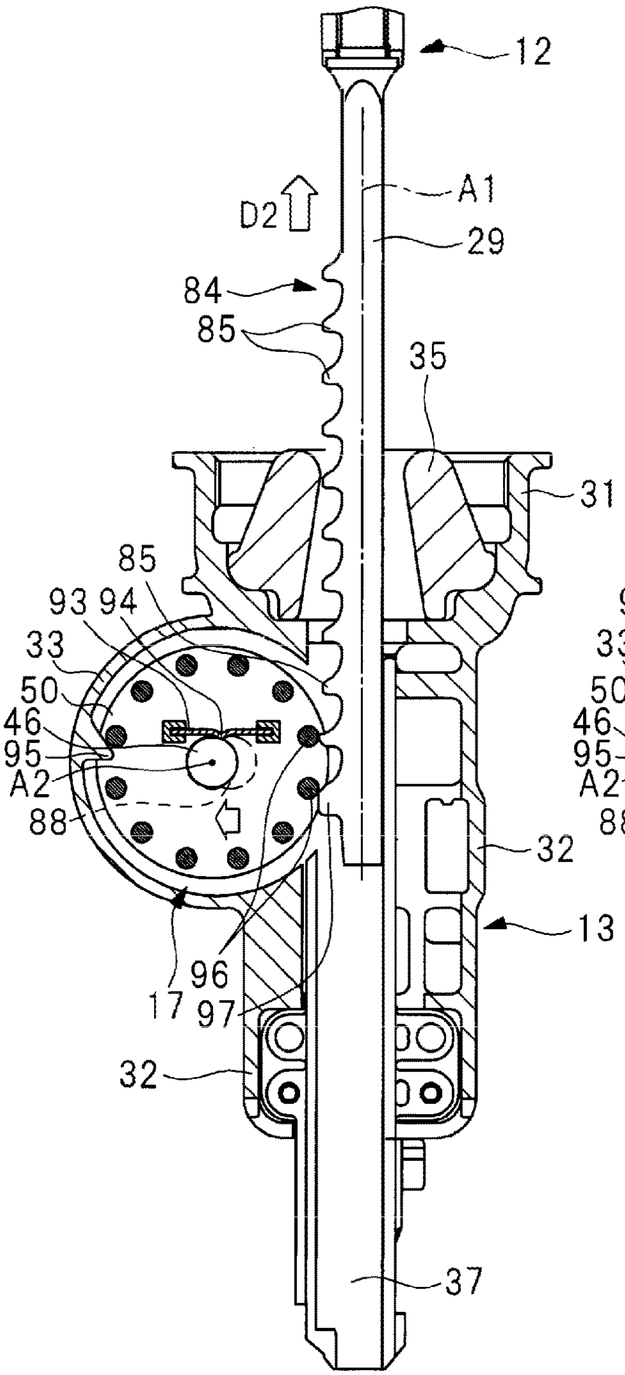
FIGS. 7(A) and 7(B) are cross-sectional views showing a second half of the actuation process in the second example of the conversion unit.

In FIG. 6(A), when the wheel 50 is rotated counterclockwise and any pin 96 is engaged with the protrusion 85, the striking unit 12 is actuated toward the top dead center. Then, when any pin 96 is pressed to the biasing portion 97 as shown in FIG. 6(B), the biasing force to the rotating shaft 46 in the direction intersecting the center line A2 is increased by the reaction force of the pin 96 pressed to the biasing portion 97. The biasing force is a load in the direction of separating the rotating shaft 46 from the driver blade 29. When the load that the rotating shaft 46 receives exceeds a predetermined value, the rotating shaft 46 gets over the preventive portion 94, and the rotating shaft 46 moves in the support hole 88 as shown in FIG. 7(A). Then, the rotating shaft 46 and the wheel 50 are stopped at an actuated position separated from the driver blade 29.

Figure 7B:
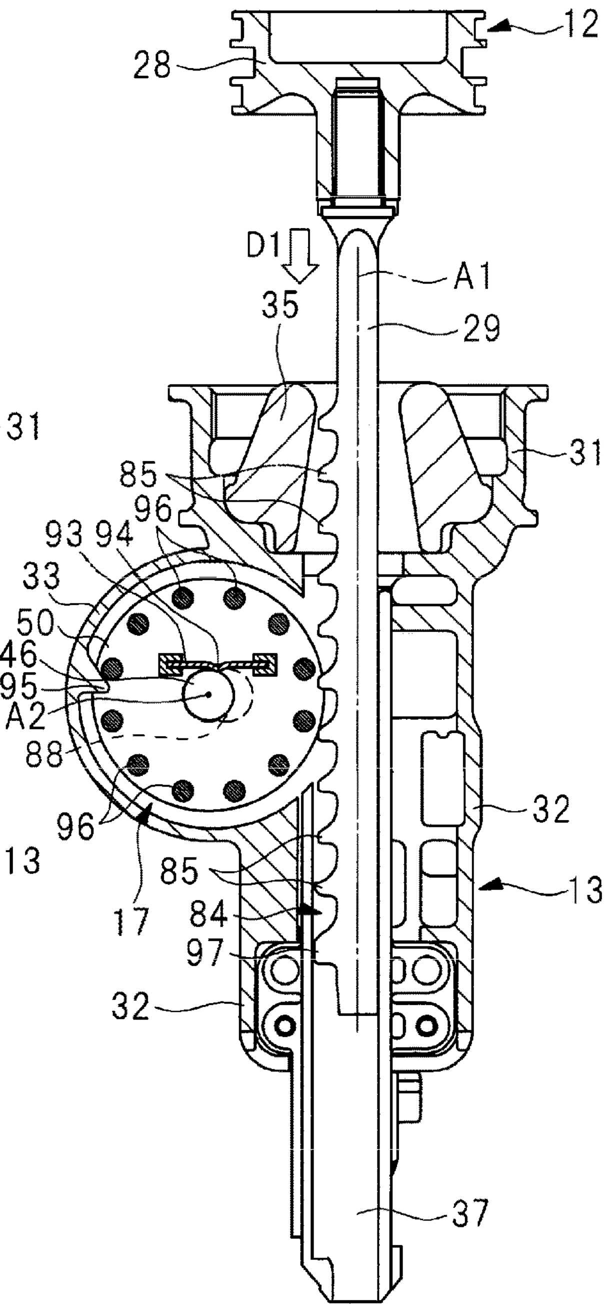

When the wheel 50 is stopped at the actuated position, all pins 96 move to the outside of the actuation region of the protrusion 85. Namely, all the pins 96 are released from the protrusions 85 as shown in FIG. 7(B). Therefore, the striking unit 12 is actuated toward the bottom dead center by the pressure of the pressure accumulation chamber, and the driver blade strikes the fastener.

When any pin 96 is pressed to the return portion 95 after the striking unit reaches the bottom dead center, a biasing force in the direction of making the rotating shaft 46 approach the driver blade 29 is generated by the reaction force thereof. When this biasing force exceeds a predetermined value, the rotating shaft 46 moves in the support hole 88, and the rotating shaft 46 and the wheel 50 are stopped at the initial position.

Therefore, the pin 96 is separated from the return portion 95, any pin 96 moves into the actuation region of the protrusion 85, and the control unit stops the electric motor. Accordingly, the striking unit 12 is stopped at the bottom dead center.

In the second example of the conversion unit 17, the wheel 50 moves in the direction away from the driver blade 29 together with the rotating shaft 46 in the process where the pin 96 is separated from the protrusion 85. Accordingly, the abrasion of at least one of the pin 96 and the driver blade 29 can be reduced, and the life of at least one of the pin 96 and the driver blade 29 can be improved.

Further, since the number of pins 96 is larger than the number of protrusions 85, the pin 96 that receives the actuation force of the striking unit 12 at the time when the striking unit 12 reaches the top dead center is changed every time when the striking unit 12 is actuated from the bottom dead center to the top dead center. Therefore, the maximum load corresponding to the actuation force of the striking unit 12 can be dispersed to different pins 96. Accordingly, the life of the pins 96 is further improved.

Figure 9:
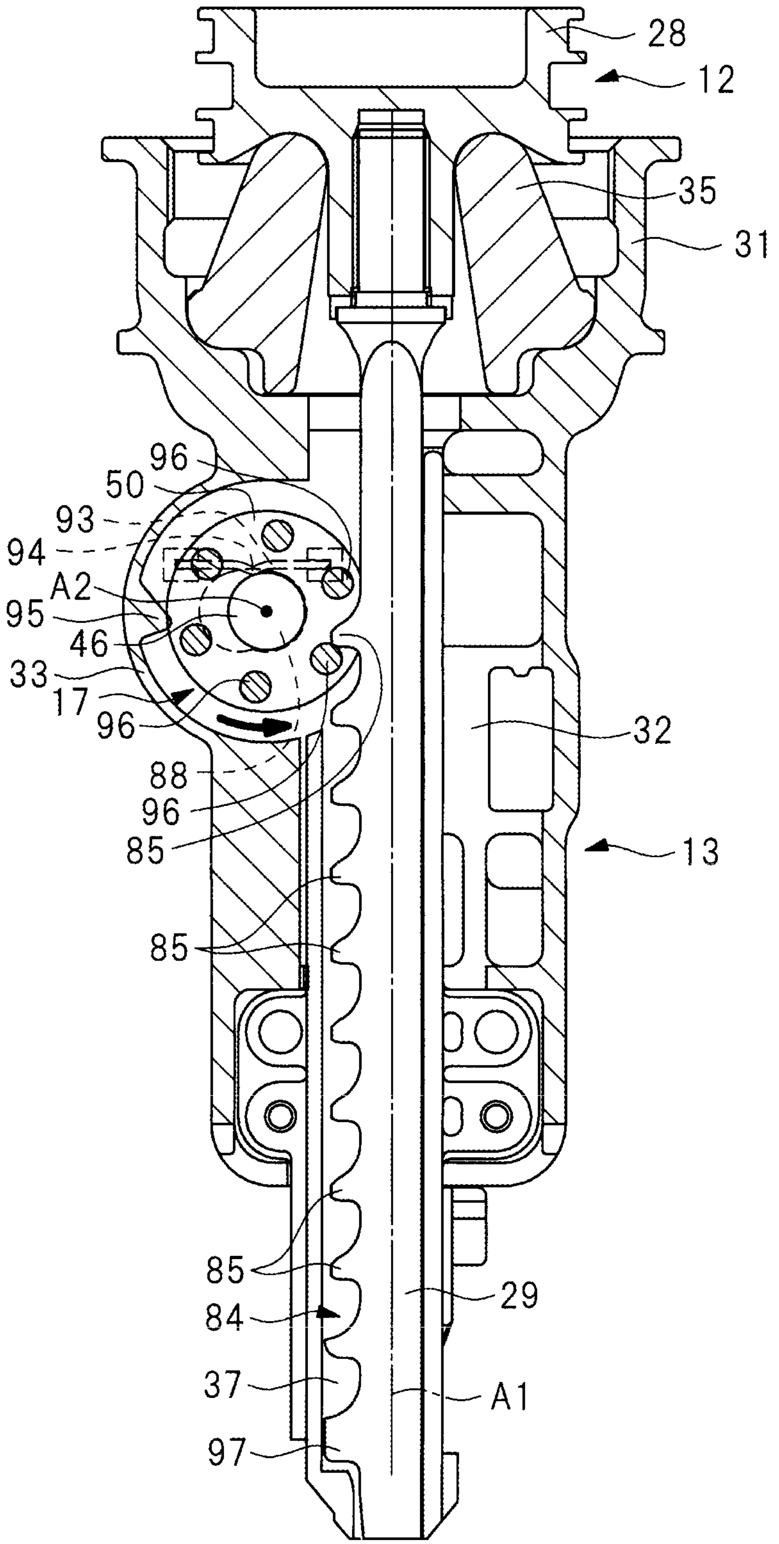
FIG. 9 is a cross-sectional view showing the second example of the conversion unit having another configuration.

FIG. 9 shows a modification of the second example of the conversion unit 17 provided in the striking unit 10. The number of pins 96 provided on the wheel 50 is smaller than the number of protrusions 85 provided on the driver blade 29. The function and effect of the conversion unit 17 shown in FIG. 9 are the same as the function and effect of the conversion unit 17 shown in FIG. 6(A), FIG. 6(B), FIG. 7(A), and FIG. 7(B). Further, in the conversion unit 17 shown in FIG. 9, the number of pins 96 provided on the wheel 50 is smaller than the number of protrusions 85 provided on the driver blade 29, and thus, the increase in the diameter of the wheel 50 can be suppressed. Therefore, it is possible to achieve the reduction in size and weight of the driving tool 10 shown in FIG. 1.

Figure 10A:
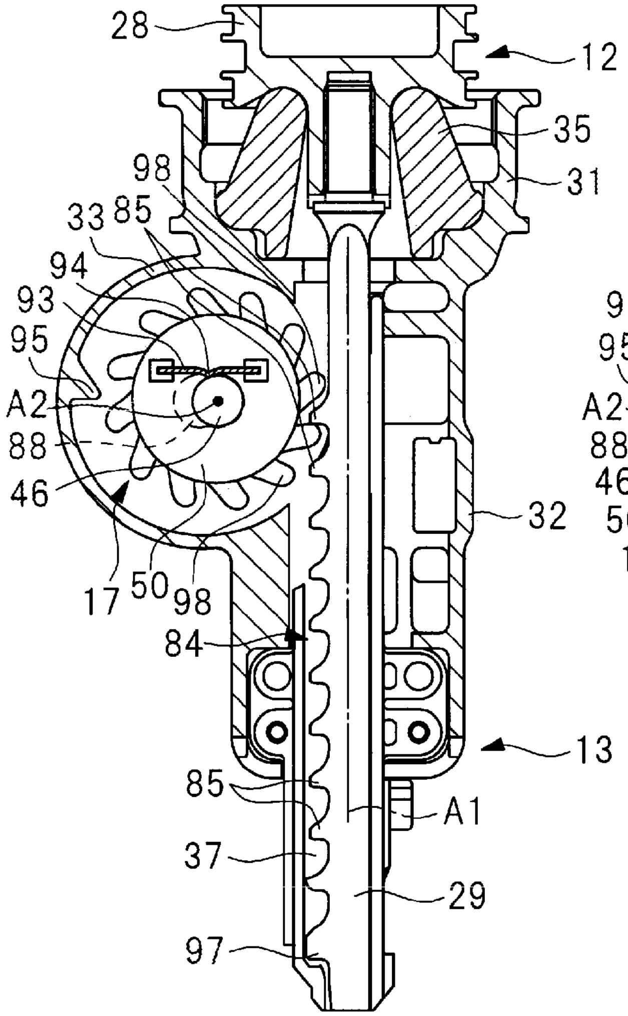
FIGS. 10(A) and 10(B) are cross-sectional views showing a first half of an actuation process in another example of the second example of the conversion unit.

FIG. 10(A) is another modification of the second example of the conversion unit 17. A plurality of tooth portions 98 are provided on the outer peripheral surface of the wheel 50. For example, the tooth portions 98 and the wheel 50 are integrally made of a metal material. The plurality of tooth portions 98 are provided at equal intervals in the rotation direction of the wheel 50. The number of tooth portions 98 is larger than the number of protrusions 85. The other configuration of the conversion unit 17 shown in FIG. 10(A) is the same as the configuration of the conversion unit 17 shown in FIG. 6(A).

When the striking unit 12 is stopped at the standby position as shown in FIG. 10(A), the rotating shaft 46 is stopped at the initial position closest to the driver blade 29 in the support hole 88.

Figure 10B:
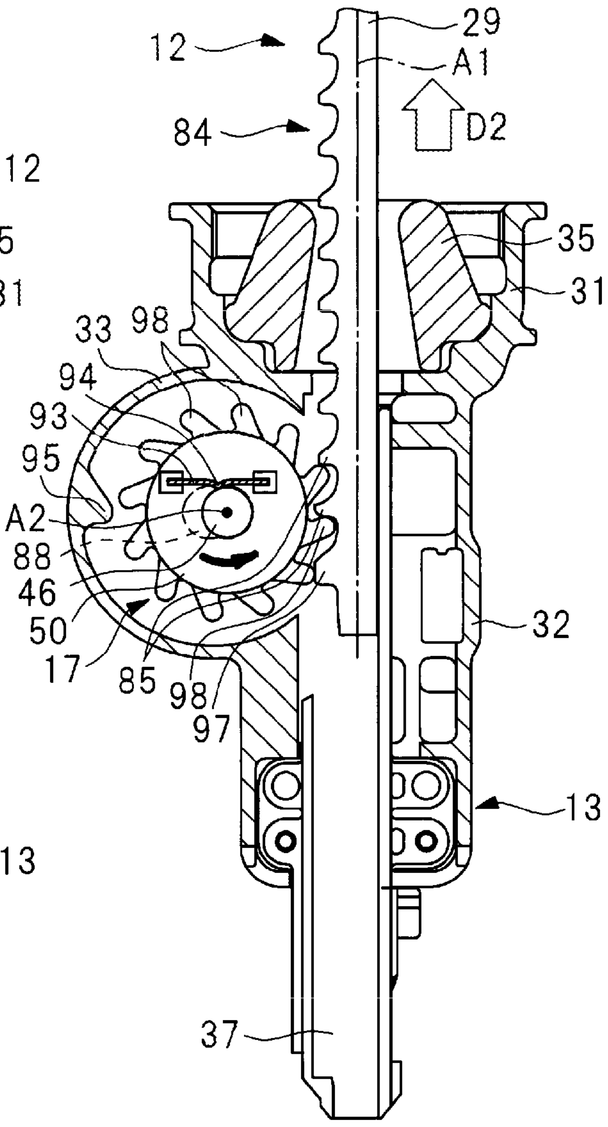

Then, when the wheel 50 is rotated and the tooth portion 98 and the protrusion 85 are engaged with each other, the rotational force of the wheel 50 is transmitted to the striking unit 12, and the striking unit 12 moves upward as shown in FIG. 10(B).

Figure 11A:
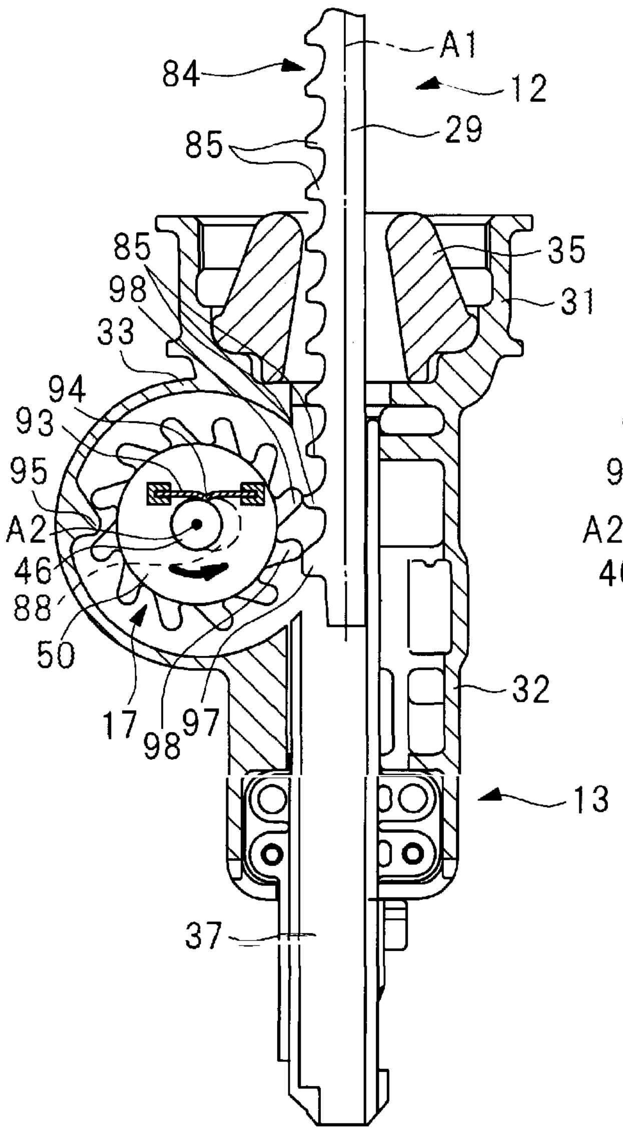
FIGS. 11(A) and 11(B) are cross-sectional views showing a second half of the actuation process in the other example of the second example of the conversion unit.

Further, when the tooth portion 98 is pressed to the biasing portion 97, the load corresponding to the reaction force thereof is transmitted to the rotating shaft 46. Therefore, the rotating shaft 46 slides in the support hole 88 in the direction away from the driver blade 29 as shown in FIG. 11(A). Then, the rotating shaft 46 is stopped at the position farthest from the driver blade 29, that is, the actuated position. All the tooth portions 98 are located outside the actuation region of the protrusion 85.

Figure 11B:
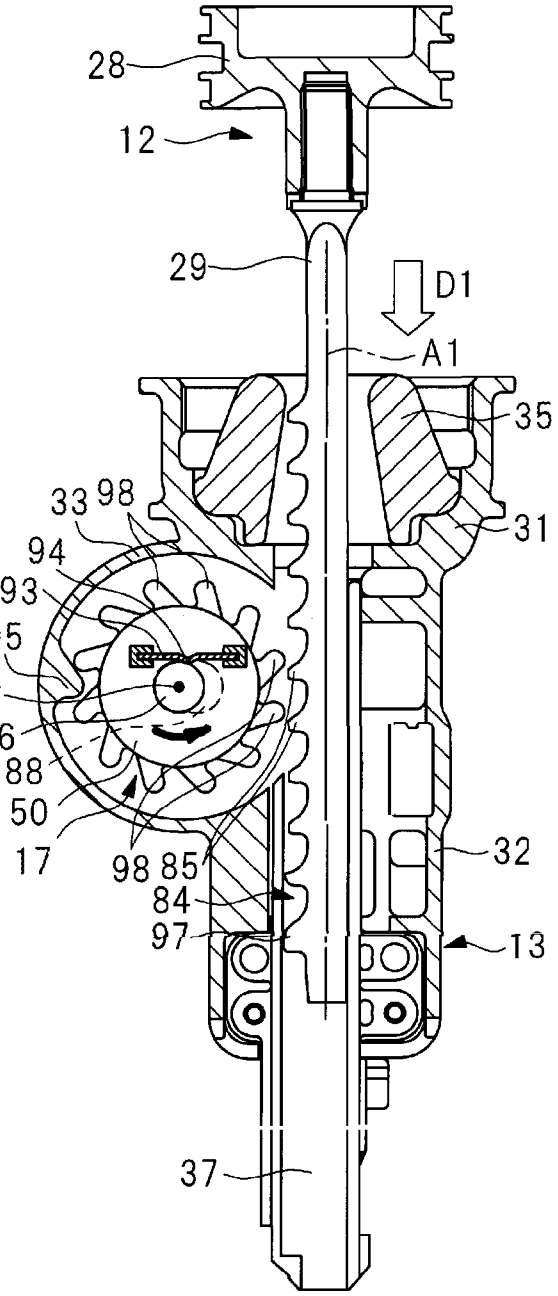

When all the tooth portions 98 are released from the protrusions 85, the striking unit 12 is actuated from the top dead center to the bottom dead center by the pressure of the pressure chamber 26 as shown in FIG. 11(B). Also, the tooth portion 98 is pressed to the return portion 95, the rotating shaft 46 is moved in the support hole 88 by the reaction force thereof from the actuated position, and the rotating shaft 46 returns to the initial position and is stopped there. The control unit 67 stops the electric motor 15 after the striking unit 12 reaches the bottom dead center.

The conversion unit 17 shown in FIG. 10(A) can obtain the same effect as the conversion unit 17 shown in FIG. 6(A). Note that the number of tooth portions 98 provided on the wheel 50 may be smaller than the number of protrusions 85.

Third Example of Conversion Unit

Figures 12A, 12B:
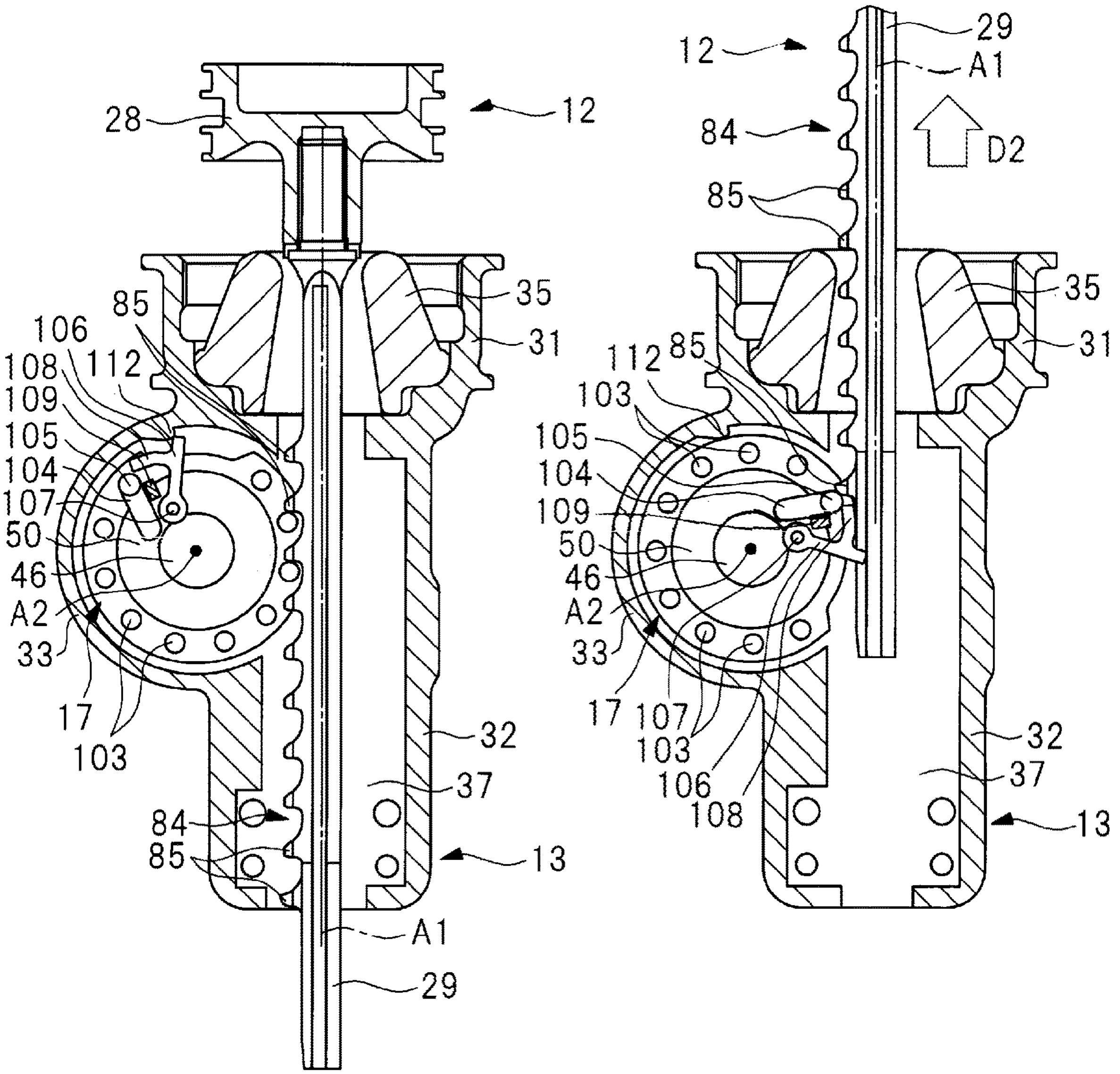
FIGS. 12(A) and 12(B) are cross-sectional views showing a first half of an actuation process in the third example of the conversion unit.

FIG. 12(A) shows the third example of the conversion unit 17. Pins 103 are provided on the wheel 50. A plurality of the pins 103 are arranged at intervals in the rotation direction of the wheel 50. The pins 103 are arranged within a range of a predetermined angle, for example, 270 degrees in the rotation direction of the wheel 50.

A guide hole 104 is provided in the wheel 50. The guide hole 104 is arranged outside the angle range in which the pins 103 are arranged in the rotation direction of the wheel 50. The guide hole 104 is arranged in the radial direction of the wheel 50. A movable pin 105 is attached to the wheel 50. The movable pin 105 is made of, for example, metal. The movable pin 105 can be actuated in the guide hole 104 in the radial direction of the wheel 50. A part of the movable pin 105 in the longitudinal direction is located outside the arrangement range of the wheel 50 in the direction of the center line A2. A biasing member 110 shown in FIG. 14(A) is provided, and the biasing member 110 biases the movable pin 105 to the outer side in the radial direction of the wheel 50. The biasing member 110 is, for example, a metal compression spring.

A pin holder 106 is attached to the wheel 50. The pin holder 106 is made of, for example, metal. The pin holder 106 is arranged outside the angle range in which the pins 103 are arranged in the rotation direction of the wheel 50. The pin holder 106 is arranged outside the arrangement range of the wheel 50 in the direction of the center line A2 and outside the actuation range of the driver blade 29. The pin holder 106 can be actuated within a predetermined angle range about a support shaft 107.

The pin holder 106 has a hook 108. In the wheel 50, a stopper 109 is provided between the guide hole 104 and the pin holder 106. A biasing member 111 shown in FIG. 14(A) is provided, and the biasing member 111 biases the pin holder 106 counterclockwise in FIG. 12(A). The biasing member 111 is, for example, a metal compression spring. The biasing force of the biasing member 111 is smaller than the biasing force of the biasing member 110.

A return portion 112 protruding from the inner surface of the tubular portion 33 is provided. The return portion 112 is separated from the outer peripheral surface of the wheel 50.

Next, the operation in the third example of the conversion unit 17 will be described. First, the control unit 67 stops the electric motor 15, and the striking unit 12 is stopped at the standby position shown in FIG. 1. When the striking unit 12 is stopped at the standby position, the movable pin 105 is biased by the biasing member 110, and the movable pin 105 is stopped by being held by the hook 108. Namely, the movable pin 105 is not engaged with the protrusion 85. The pin holder 106 is stopped by coming into contact with the stopper 109.

When the control unit 67 rotates the electric motor 15, the wheel 50 is rotated counterclockwise in FIG. 12(A), and the pin 103 is engaged with the protrusion 85, the striking unit 12 is actuated in the direction D2, that is, moves upward.

When the return portion 112 is engaged with the pin holder 106 by the rotation of the wheel 50 as shown in FIG. 12(A), the pin holder 106 is actuated clockwise with respect to the wheel 50, and the pin holder 106 is separated from the stopper 109. Then, the movable pin 105 is actuated in the guide hole 104 by the biasing force of the biasing member 110, and the movable pin 105 is stopped at the outermost position in the radial direction of the wheel 50, that is, the initial position.

By the rotation of the wheel 50, the plurality of pins 103 are individually engaged with and released from the protrusions 85. The movable pin 105 is engaged with the protrusion 85 before all the pins 103 are released from the protrusions 85.

Figure 13A:
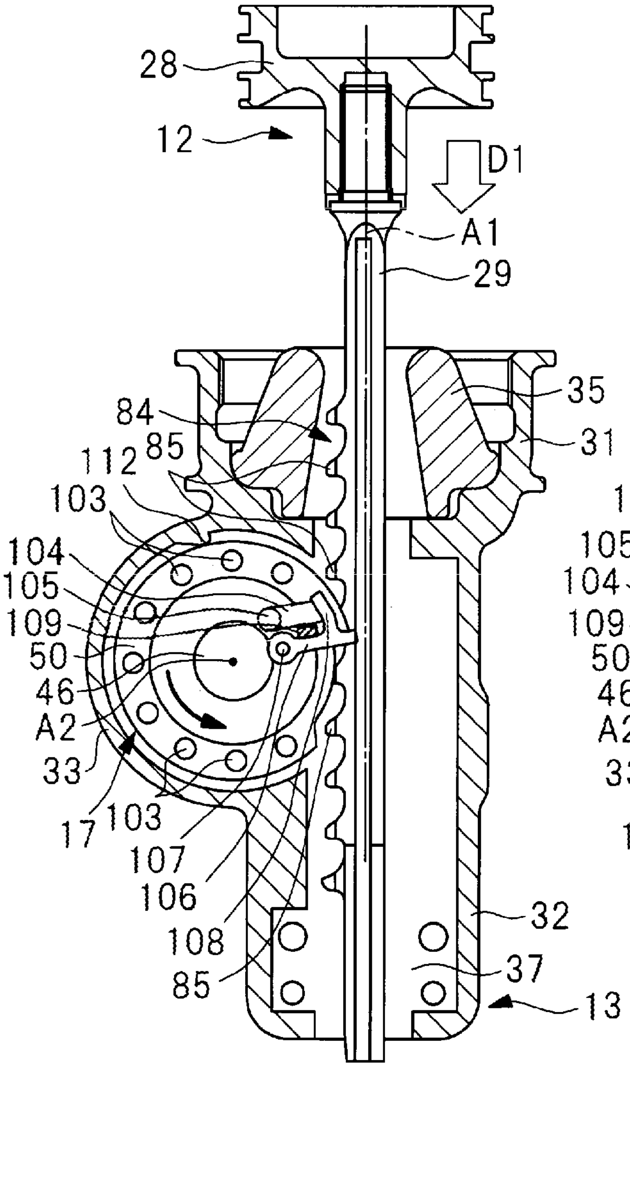
FIGS. 13(A) and 13(B) are cross-sectional views showing a second half of the actuation process in the third example of the conversion unit.

Before the striking unit 12 reaches the top dead center, all the pins 103 are released from the protrusions 85 as shown in FIG. 12(B). Next, when the component force of the load applied to the movable pin 105 from the protrusion 85 increases, the movable pin 105 pushed by the component force is actuated in the guide hole 104 toward the inner side in the radial direction of the wheel 50 as shown in FIG. 13(A), and the movable pin 105 is released from the protrusion 85.

Figure 13B:
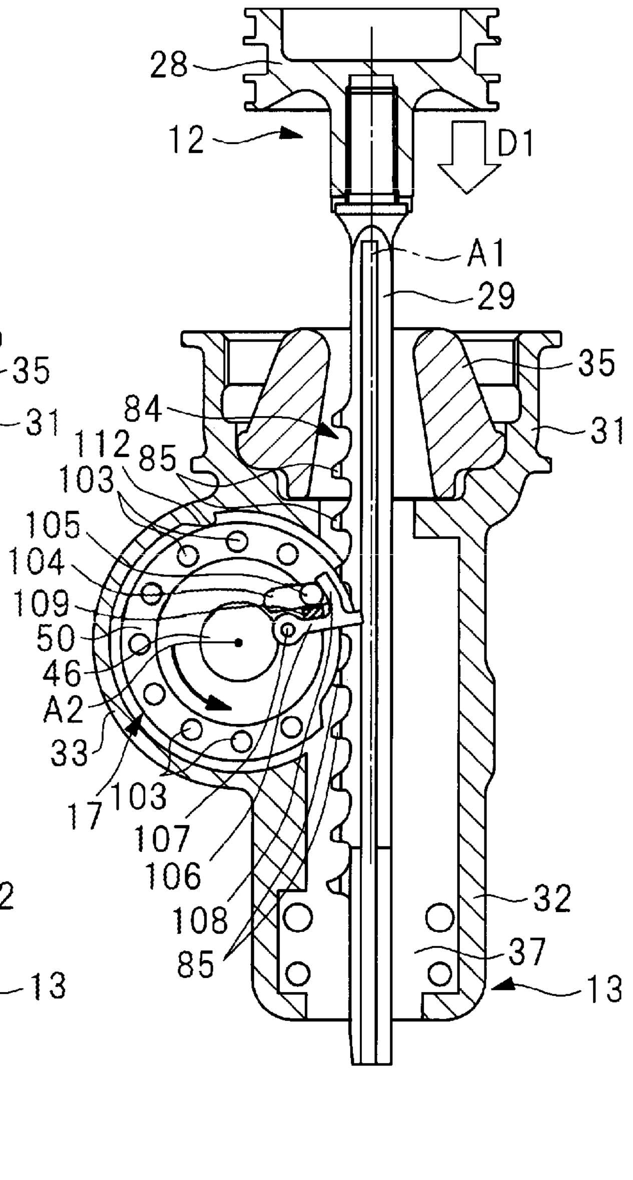

Also, when the movable pin 105 is actuated in the guide hole 104, the pin holder 106 is actuated counterclockwise by the biasing force of the biasing member 111, and the pin holder 106 is stopped by coming into contact with the stopper 109. Therefore, when the movable pin 105 is actuated toward the initial position by the biasing force of the biasing member 110 and the reaction generated by the collision of the movable pin 105 to the inner wall surface of the guide hole 104, the hook 108 supports the movable pin 105 as shown in FIG. 13(B). Namely, the hook 108 prevents the movable pin 105 from colliding with the protrusion 85.

The striking unit 12 is actuated in the first direction D1 by the pressure of the pressure chamber 26, that is, moves downward, and the striking unit 12 reaches the bottom dead center. The control unit 67 stops the electric motor 15 after the striking unit 12 reaches the bottom dead center.

The operation in which the movable pin 105 engaged with the protrusion 85 is released from the protrusion 85 will be described with reference to FIG. 14(A) and FIG. 14(B). When the movable pin 105 is engaged with the protrusion 85, a load F1 is applied to a contact position P1 between the protrusion 85 and the movable pin 105. The load F1 is parallel to the first direction D1. Further, the movable pin 105 receives component forces F2 and F3 of the load F1. The component force F2 is a component in the longitudinal direction of the guide hole 104, and the component force F3 is a component in the direction perpendicular to the longitudinal direction of the guide hole 104.

When the component force F2 is directed so as to bring the movable pin 105 closer to the driver blade 29 as shown in FIG. 14(A), the movable pin 105 is stopped at the initial position. Namely, the movable pin 105 is engaged with the protrusion 85, and the rotational force of the wheel 50 is transmitted to the protrusion 85 via the movable pin 105.

Figure 14B:
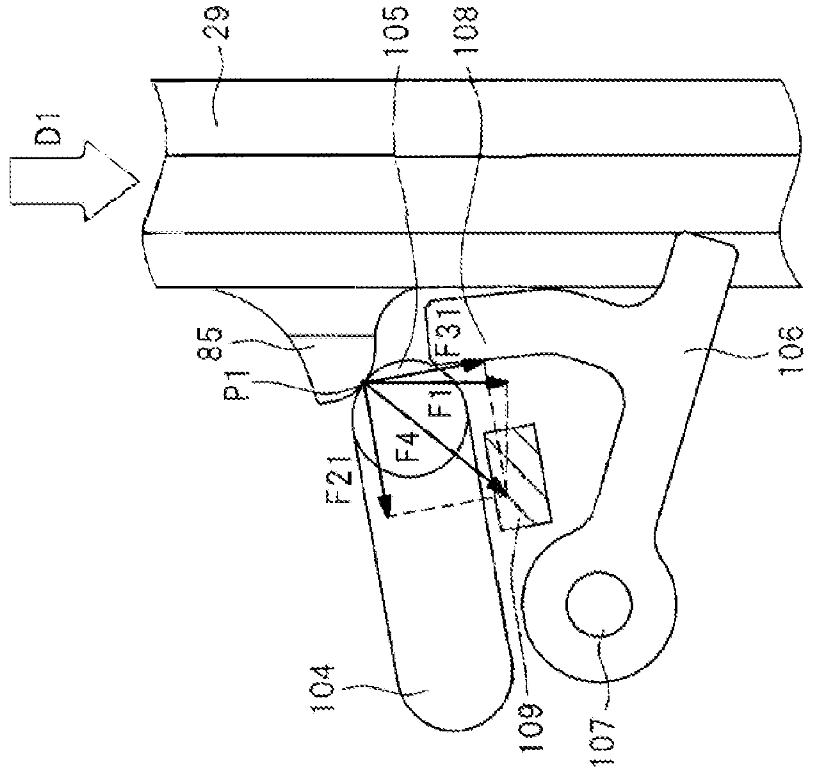
FIGS. 14(A) and 14(B) are enlarged views showing a principal part of FIG. 13(B).
Figure 14A:
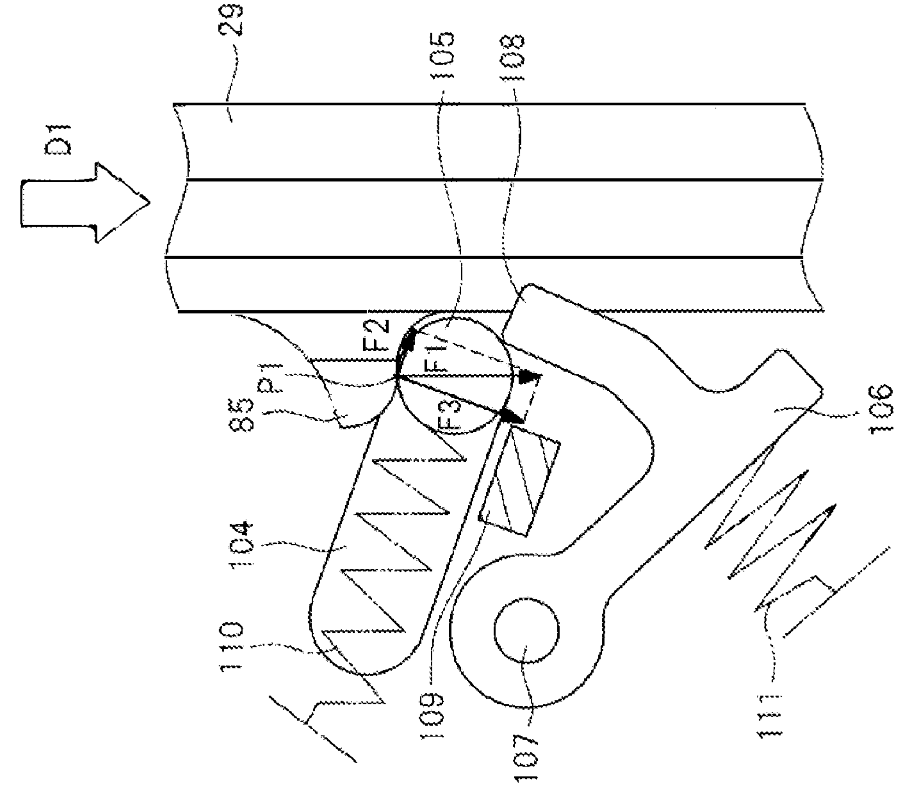

On the other hand, when the contact position P1 moves toward the tip of the protrusion 85 by the rotation of the wheel 50 as shown in FIG. 14(B), a load F4 is applied to the movable pin 105 in response to the load F1. The movable pin 105 receives component forces F21 and 31 of the load F4. The component force F21 is a component in the longitudinal direction of the guide hole 104, and the component force F31 is a component in the direction perpendicular to the longitudinal direction of the guide hole 104. Here, the component force F21 is in the direction away from the driver blade 29. Therefore, the movable pin 105 is actuated from the initial position against the biasing force of the biasing member 110, and the movable pin 105 is separated, that is, released from the protrusion 85.

As described above, the movable pin 105 is actuated from the initial position by the component force F21 of the load F4 applied from the protrusion 85 to the movable pin 105. Namely, the movable pin 105 moves to the outside of the actuation region of the protrusion 85, and the movable pin 105 is released from the protrusion 85. Therefore, it is possible to suppress the increase in the frictional force at the contact position P1 between the movable pin 105 and the protrusion 85 in the process of releasing the movable pin 105 from the protrusion 85. Accordingly, the abrasion of at least one of the movable pin 105 and the protrusion 85 can be reduced, and the product life of at least one of the movable pin 105 and the driver blade 29 can be improved.

In addition, if the movable pin 105 is designed to be independently attachable and detachable with respect to the wheel 50, what is required when the movable pin 105 is worn out is just to exchange the movable pin 105, and it is not necessary to exchange the overall wheel 50.

Further, since the hook 108 supports the movable pin 105, it is possible to prevent the movable pin 105 from colliding with the protrusion 85, and the durability of the protrusion 85 and the movable pin 105 can be improved.

In each example, the standby position of the striking unit may be a state where the piston 28 is separated from the bumper 35. Further, in the conversion unit 17 shown in FIG. 3(A), FIG. 3(B), FIG. 4(A), and FIG. 4(B), it is also possible to provide a biasing member for biasing the movable piece 79 clockwise. In this case, when the contact portion 82 is separated from the guide portion 83, the movable piece 79 is actuated clockwise from the initial position by the biasing force of the biasing member, and the engaging portion 81 is released from the protrusion 85.

An example of the relationship between the matters disclosed in the embodiment of the driving machine 10 and the matters described in the claims is as follows. The first direction D1 is an example of a first direction, and the second direction D2 is an example of a second direction. The striking unit 12 is an example of a striking unit. The nail 59 is an example of a fastener. The rack 84 is an example of a first transmission portion. The movement in an arc shape about the center line A2 is an example of rotation in a predetermined direction. The tooth portion 78, the pins 96 and 103, the movable piece 79, and the movable pin 105 are examples of a second transmission portion.

The tooth portion 78 and the pin 103 are examples of a first engaging portion. The engaging portion 81 of the movable piece 79 and the movable pin 105 are examples of a second engaging portion.

The pin 96 that is engaged with and released from the protrusion 85 in the state where the pin 96 is not pressed to the biasing portion 97 in FIG. 6(A), FIG. 6(B), FIG. 7(A), FIG. 7(B), and FIG. 9 is an example of a first engaging portion. The pin 96 that is engaged with and released from the protrusion 85 in the state where the pin 96 is pressed to the biasing portion 97 is an example of a second engaging portion.

The tooth portion 98 that is engaged with and released from the protrusion 85 in the state where the tooth portion 98 is not pressed to the biasing portion 97 in FIG. 10(A) is an example of a first engaging portion. The tooth portion 98 that is engaged with and released from the protrusion 85 in the state where the tooth portion 98 is pressed to the biasing portion 97 in FIG. 10(B) is an example of a second engaging portion.

The direction in which the engaging portion 81 of the movable piece 79 shown in FIG. 4(A) and FIG. 4(B) is actuated toward the inner side in the radial direction of the wheel 50 is an example of a different direction. The direction in which the pin 96 is actuated in the direction away from the driver blade 29 by actuating the wheel 50 and the rotating shaft 46 along the support hole 88 as shown in FIG. 7(A) is an example of a different direction.

The direction in which the pin 96 is actuated in the direction away from the driver blade 29 by actuating the wheel 50 and the rotating shaft 46 along the support hole 88 as shown in FIG. 9 is an example of a different direction.

The direction in which the tooth portion 98 is actuated in the direction away from the driver blade 29 by actuating the wheel 50 and the rotating shaft 46 along the support hole 88 as shown in FIG. 11(A) is an example of a different direction.

The direction in which the movable pin 105 is actuated in the guide hole 104 toward the inner side of the wheel as shown in FIG. 13(A) is an example of a different direction.

The position where the contact portion 82 is in contact with the outer peripheral surface of the guide portion 83 and the engaging portion 81 can be engaged with the protrusion 85 as shown in FIG. 3(B) is an example of an initial position. The position where the rotating shaft 46 is at the initial position and the pin 96 can be engaged with the protrusion 85 as shown in FIG. 6(A) is an example of an initial position. The position where the rotating shaft 46 is at the initial position and the pin 96 can be engaged with the protrusion 85 as shown in FIG. 9 is an example of an initial position. The position where the rotating shaft 46 is at the initial position and the tooth portion 98 can be engaged with the protrusion 85 as shown in FIG. 10(A) is an example of an initial position. The position where the movable pin 105 is biased by the biasing member 110 and is stopped at the outermost side of the wheel 50 as shown in FIG. 12(A) is an example of an initial position.

The guide portion 83, the return portion 95, and the biasing member 110 are examples of a return mechanism. The return portions 95 and 112 are examples of an overhanging portion. The tubular portion 33 is an example of a case. The tooth portions 78 and 98 are examples of a tooth portion. The pin 96 and the movable pin 105 are examples of a pin. The support shaft 80 is an example of a support shaft. The wheel 50 is an example of a rotating member.

The biasing portion 97 is an example of a load receiving portion. The positioning member 93 is an example of a first stopper. The guide hole 104 is an example of a guide portion. The pin holder 106 is an example of a second stopper.

In the driving tool disclosed in this embodiment, the second engaging portion is engaged with the first transmission member in the state where the rotating member is being rotated in one direction, and the second engaging portion is released from the first transmission member by actuating the second engaging portion in a different direction in the state where the rotating member is being rotated in one direction.

The driving tool is not limited to the embodiment described above, and various changes can be made without departing from the gist thereof. For example, the standby position of the striking unit may be a position where the piston 28 is separated from the bumper 35. In this case, when the electric motor 15 is stopped, the rotation preventive mechanism 53 prevents the rotation of the wheel 50, and the striking unit 12 is stopped at the standby position.

Further, it is also possible to provide a biasing member for biasing the movable piece 79 clockwise in the conversion unit 17 shown in FIG. 3(A), FIG. 3(B), FIG. 4(A), and FIG. 4(B). In this case, when the contact portion 82 is separated from the guide portion 83, the movable piece 79 is actuated clockwise from the initial position by the biasing force of the biasing member, and the engaging portion 81 is released from the protrusion 85.

Further, the first transmission portion provided on the driver blade 29 shown in FIG. 3(A), FIG. 3(B), FIG. 4(A), and FIG. 4(B) may be a plurality of pins attached to the driver blade 29 at intervals in the direction of the center line A1. Then, when the wheel 50 is rotated, the tooth portions 78 can be individually engaged with and released from the pins. Further, the engaging portion 81 can be engaged with and released from the pin. Further, the movable piece 79 is actuated clockwise by the load applied from the pin to the engaging portion 81, and the engaging portion 81 is released from the pin.

The support hole 88 is a guide portion that restricts the actuation direction of the rotating shaft 46 to a different direction, and examples of the guide portion that restricts the actuation direction of the rotating shaft 46 to a different direction include a groove, a rail, and a notch in addition to the hole.

The guide hole 104 is a guide portion that restricts the actuation direction of the movable pin 105 to a different direction, and examples of the guide portion that restricts the actuation direction of the movable pin 105 to a different direction include a groove, a rail, and a notch in addition to the hole.

In this embodiment, "the actuation direction is a different direction" is an actuation direction in the plane perpendicular to the center line A2 of the rotating shaft 46.

Further, the biasing mechanism for actuating the striking unit in the first direction may be a solid spring, synthetic rubber, or a magnetic spring in addition to the pressure chamber in which compressible gas is filled. Examples of the solid spring include a metal compression spring and a tension spring. The solid spring and the synthetic rubber actuate the striking unit in the first direction by the elastic restoring force. The magnetic spring actuates the striking unit in the first direction by the repulsive force between the magnets having the same polarity.

The power source unit that applies a voltage to the electric motor 15 may be either a DC power source or an AC power source. As the motor for actuating the striking unit in the second direction, any one of a hydraulic motor, a pneumatic motor, and an engine can be used instead of the electric motor.

The shape and structure of the first transmission portion and the second transmission portion are not particularly limited as long as they can be engaged with and released from each other. The first transmission portion and the second transmission portion can be formed by combining recesses, grooves, claws, and the like in addition to gears, pins, protrusions, and racks. Examples of the rotating member include a gear, a pulley, a rotating shaft, a drum, a cylindrical member, and the like in addition to the wheel.

When the rotating member is rotated, the first engaging portion and the second engaging portion are turned about the center line, that is, are revolved.

The following first and second configurations are described in this embodiment.

The first configuration includes a striking unit capable of being actuated in a first direction and a second direction opposite to the first direction and capable of striking a fastener by being actuated in the first direction, a biasing mechanism configured to actuate the striking unit in the first direction, a housing configured to support the striking unit, a motor supported by the housing, a rotating member configured to be rotated in a predetermined direction by a rotational force of the motor, a first transmission portion provided on the striking unit, and a second transmission portion provided on the rotating member and capable of being engaged with and released from the first transmission portion, wherein when the rotating member is rotated and the second transmission portion is engaged with the first transmission portion, the striking unit is actuated in the second direction against a force of a biasing mechanism, and when the second transmission portion is released from the first transmission portion, the striking unit is actuated in the second direction by the force of the biasing mechanism.

The second configuration is that the motor in the first configuration is an electric motor configured to be rotated by applying a voltage, and a power source unit configured to apply the voltage to the electric motor is provided in the housing.

REFERENCE SIGNS LIST

10 . . . driving tool, 33 . . . tubular portion, 50 . . . wheel, 78, 98 . . . tooth portion, 79 . . . movable piece, 80 . . . support shaft, 81 . . . engaging portion, 83 . . . guide portion, 84 . . . rack, 93 . . . positioning member, 95, 112 . . . return portion, 96, 103 . . . pin, 97 . . . biasing portion, 104 . . . guide hole, 105 . . . movable pin, 106 . . . pin holder, 110 . . . biasing member, D1 . . . first direction, D2 . . . second direction

The invention claimed is:

1. A driving tool comprising:

a striking unit configured to move along a moving axis in a first direction to strike a fastener and in a second direction opposite the first direction;

a first transmission portion provided on the striking unit;

a driving mechanism comprising:

a motor;

an output element coupled to the motor; and a rotating member coupled to the output element and configured to rotate about a rotational center axis in a first rotation direction in response to rotation of the motor; and a second transmission portion provided on the rotating member and configured to be engaged with and released from the first transmission portion, wherein the striking unit, the first transmission portion, and the second transmission portion are arranged in that order along a third direction intersecting the moving axis and the rotational center axis, wherein the striking unit is configured to:

move in the second direction in response to the second transmission portion being engaged with the first transmission portion, and move in the first direction in response to the second transmission portion being released from the first transmission portion, wherein the rotating member is supported for movement in the third direction and in a fourth direction opposite the third direction, wherein the second transmission portion is moved, together with the rotating member, in the third direction away from the striking unit, in response to a reaction force applied from the striking unit during rotation of the rotating member in the first rotation direction, wherein the second transmission portion further is moved, together with the rotating member, in the fourth direction, as the rotating member further rotates in the first rotation direction, wherein the rotating member has a linear guide, and the output element has a follower that slidably engages the linear guide, and wherein, during rotation of the output element, engagement between the linear guide and the follower transmits rotational force from the motor to the rotating member while permitting the rotating member to move in the third or fourth direction.

2. The driving tool according to claim 1, wherein a center axis of the motor is coaxial with the rotational center axis and passes through the rotating member.

3. A driving tool comprising:

a striking unit configured to move along a moving axis in a first direction to strike a fastener and in a second direction opposite the first direction;

a first transmission portion provided on the striking unit;

a driving mechanism comprising:

a motor;

an output element coupled to the motor; and a rotating member coupled to the output element and configured to rotate about a rotational center axis in a first rotation direction in response to rotation of the motor, wherein the striking unit, the first transmission portion, and the rotating member are arranged in that order along a third direction intersecting the moving axis; and a second transmission portion provided on the rotating member and configured to be engaged with and released from the first transmission portion, wherein the output element and the rotating member are coupled via a guide and a follower, the guide extending in a direction that intersects the rotational center axis and the follower slidably engaging the guide, wherein, during rotation of the output element, engagement between the guide and the follower transmits a rotational force from the motor to the rotating member to rotate in the first rotation direction, and wherein transmission of the rotational force from the motor to the rotating member is maintained even while the follower slides within the guide.

4. The driving tool according to claim 3, wherein the rotating member is supported for movement in the third direction and a fourth direction opposite the third direction, wherein the rotating member is moved in the third direction away from the striking unit, in response to a reaction force applied from the striking unit during rotation of the rotating member in the first rotation direction, and wherein the rotating member is further moved in the fourth direction, as the rotating member further rotates in the first rotation direction.

5. The driving tool according to claim 3, further comprising an elastically deformable positioning member configured to press against the rotating member associated with the engaging portion to maintain the rotating member at an initial position and to restrain movement in the third direction until a predetermined load is exceeded.

6. The driving tool according to claim 3,
wherein the rotating member has the guide, and
wherein the output element has the follower.

7. The driving tool according to claim 3, wherein the rotational center axis intersects the guide as viewed along the rotational center axis.

8. The driving tool according to claim 3,
wherein a rotor shaft of the motor, the output element, and the rotating member are arranged concentrically about a common center line, and
wherein the rotating member is configured to be movable in a direction intersecting the common center line such that the rotational center axis of the rotating member shifts away from the center line.

9. The driving tool according to claim 8, further comprising a magazine configured to hold fasteners,
wherein a longitudinal axis of the magazine is oriented at a non-orthogonal angle with respect to the rotational center axis.

10. The driving tool according to claim 3, wherein the rotating member comprises a plurality of pins, each of the pins being supported at both ends and arranged along a circumferential direction of the rotating member.

11. The driving tool according to claim 3, further comprising a tubular cover that covers the rotating member,
wherein the tubular cover includes an opening on one side facing the first transmission portion, and
wherein an inner space is formed inside the tubular cover on an opposite side for movement of the rotating member along the third direction.

12. The driving tool according to claim 3, further comprising:
a cylinder in which the striking unit travels along the moving axis; and
a pressure chamber configured to be filled with a gas for moving the striking unit in the first direction.

13. A driving tool comprising:
a striking unit configured to move in a first direction to strike a fastener and in a second direction opposite the first direction;
a first transmission portion provided on the striking unit;
a motor;
a deceleration mechanism coupled to the motor;
a rotating member configured to rotate about a rotational center axis in a first rotation direction;
a second transmission portion provided on the rotating member and configured to be engaged with and released from the first transmission portion; and
wherein the motor, the deceleration mechanism, and the rotating member are arranged coaxially about a common center line, and
wherein the rotating member is configured to be movable in a third direction intersecting the center line such that the rotational center axis of the rotating member shifts away from the center line.

14. The driving tool according to claim 13, wherein the striking unit, the first transmission portion, and the rotating member are arranged in that order along the third direction, and the rotating member is movable in the third direction away from the striking unit.

15. The driving tool according to claim 13, further comprising a magazine configured to hold fasteners,
wherein a longitudinal axis of the magazine is oriented at a non-orthogonal angle with respect to the rotational center axis.

16. The driving tool according to claim 13, wherein a rotor shaft of the motor, an output shaft of the deceleration mechanism, and the rotational center axis of the rotating member are aligned along the common center line.

17. The driving tool according to claim 13, wherein the rotating member is moved in the third direction away from the striking unit in response to a reaction force applied from the striking unit to the second transmission portion during rotation of the rotating member in the first rotation direction.

* * * * *